United States Patent
Rais-Ghasem et al.

(10) Patent No.: US 11,481,654 B2
(45) Date of Patent: Oct. 25, 2022

(54) COGNITIVE RULE ENGINE

(71) Applicant: QlikTech International AB, Lund (SE)

(72) Inventors: Mohsen Rais-Ghasem, Ottawa (CA); Elif Tutuk, Verona, WI (US)

(73) Assignee: QLIKTECH INTERNATIONAL AB, Lund (SE)

( * ) Notice: Subject to any disclaimer, the term of this patent is extended or adjusted under 35 U.S.C. 154(b) by 862 days.

(21) Appl. No.: 15/984,116

(22) Filed: May 18, 2018

(65) Prior Publication Data
US 2019/0065972 A1    Feb. 28, 2019

Related U.S. Application Data

(60) Provisional application No. 62/505,691, filed on May 12, 2017.

(51) Int. Cl.
| | |
|---|---|
| *G06N 5/04* | (2006.01) |
| *G06F 16/248* | (2019.01) |
| *G06F 16/2455* | (2019.01) |
| *G06F 16/242* | (2019.01) |

(52) U.S. Cl.
CPC .......... *G06N 5/043* (2013.01); *G06F 16/248* (2019.01); *G06F 16/2423* (2019.01); *G06F 16/24564* (2019.01)

(58) Field of Classification Search
CPC ............... G06N 5/043; G06F 16/2423; G06F 16/24564; G06F 16/248
See application file for complete search history.

(56) References Cited

U.S. PATENT DOCUMENTS

| | | | |
|---|---|---|---|
| 5,978,788 A | 11/1999 | Castelli et al. | |
| 7,058,621 B1 | 6/2006 | Wolgé | |
| 8,244,741 B2 | 8/2012 | Wolgé | |
| 8,745,099 B2 | 6/2014 | Wolgé et al. | |
| 2013/0144605 A1* | 6/2013 | Brager | G06F 40/40 704/9 |
| 2014/0108467 A1* | 4/2014 | Tutuk | G06F 16/2282 707/803 |
| 2015/0339369 A1* | 11/2015 | Rais-Ghasem | G06F 16/282 707/739 |
| 2015/0350844 A1* | 12/2015 | Agarwal | H04W 4/33 455/456.2 |

OTHER PUBLICATIONS

U.S. Appl. No. 14/054,321, filed Apr. 17, 2014, Tutuk et al.
European Search Report dated Feb. 4, 2019 by the European Patent Office for EP Application No. 18213960.0 (Applicant—QlikTech International AB) (9 Pages).
U.S. Appl. No. 62/505,691, filed May 12, 2017, Moshen Rias-Ghasem.

* cited by examiner

*Primary Examiner* — Eric Nilsson
(74) *Attorney, Agent, or Firm* — Ballard Spahr LLP

(57) ABSTRACT

In an aspect, provided is a method comprising monitoring one or more data analysis sessions, determining, based on the monitoring, a common data analysis technique performed across common data analysis sessions, identifying the common data analysis technique as a precedent, and providing the precedent to a precedent engine.

19 Claims, 31 Drawing Sheets

FIG. 4A

| Client | Year | Sum (Number * Price) |
|---|---|---|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

Sum (Number * Price) Per Client, Year

|  | 1999 | <NULL> | <ALL> |
|---|---|---|---|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

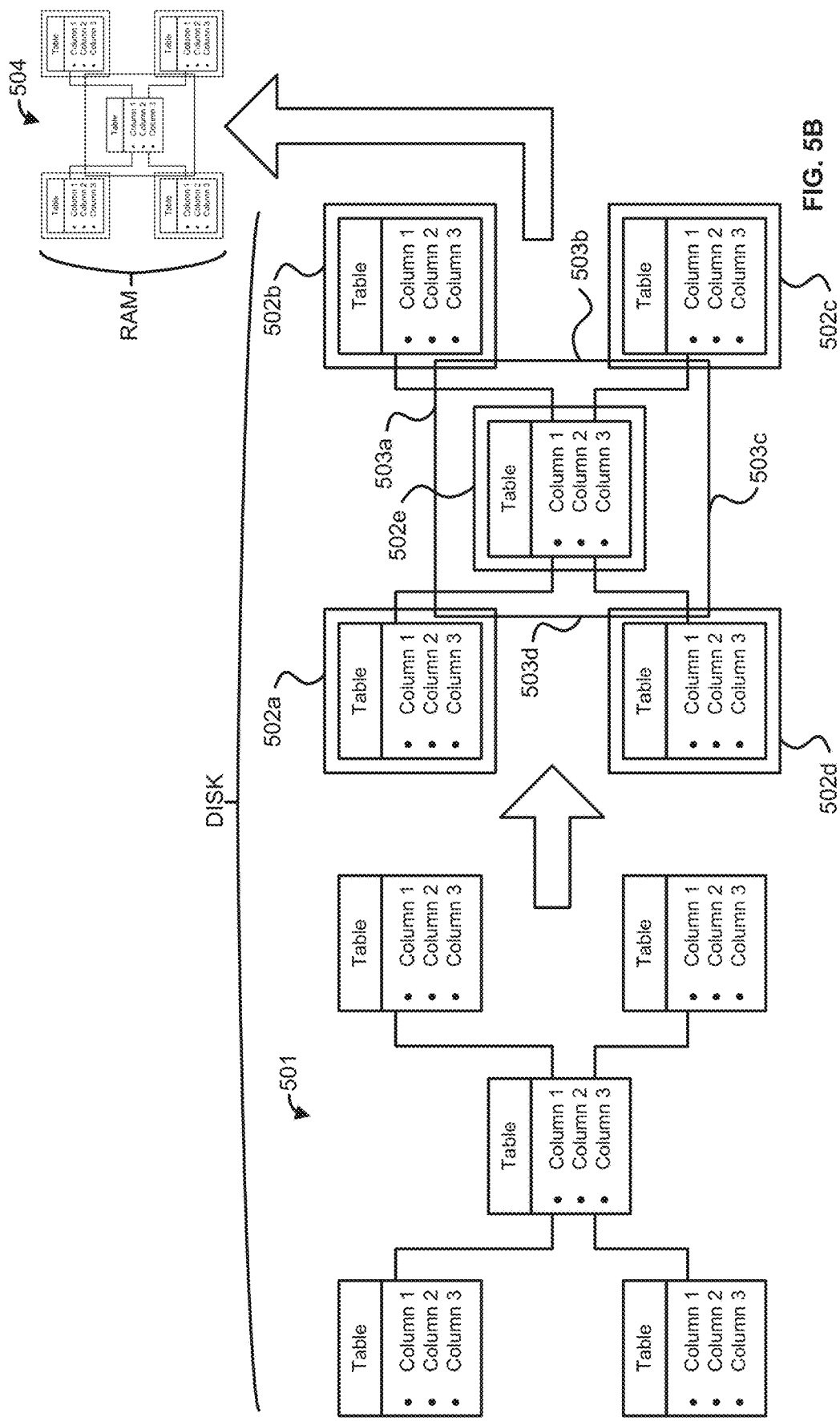

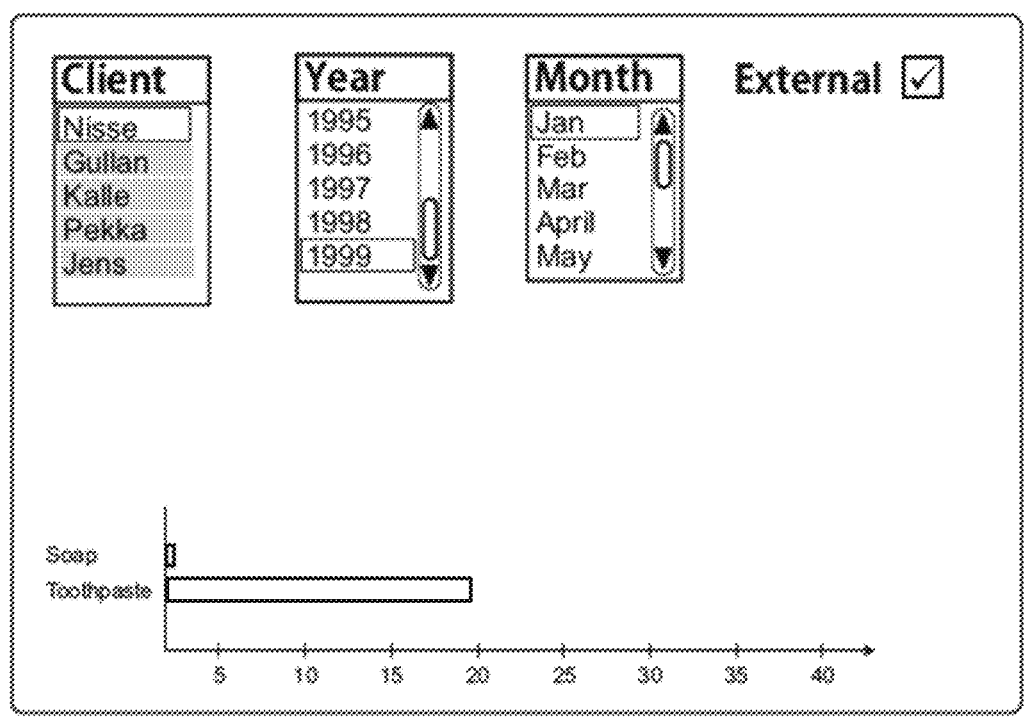

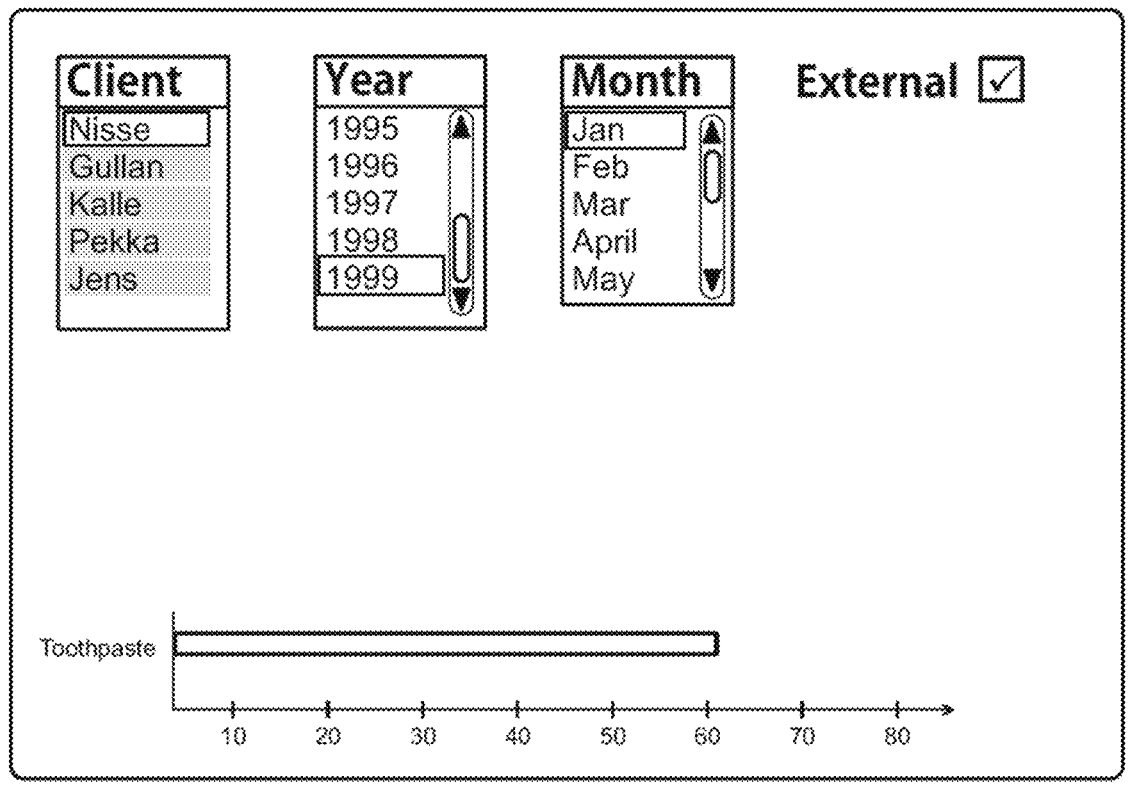

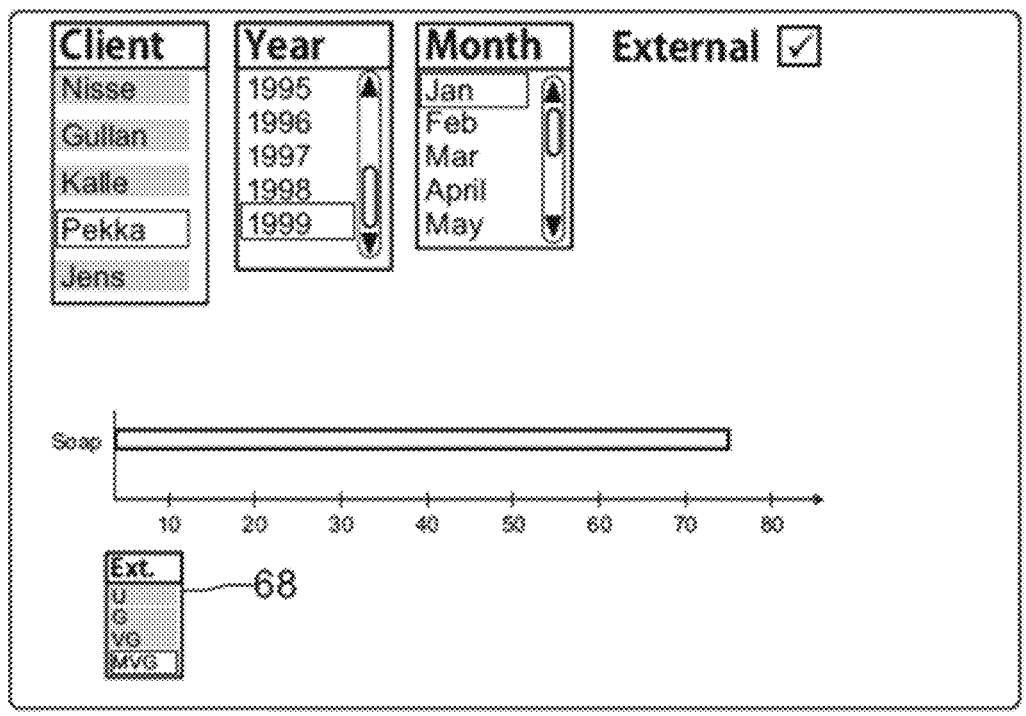

| Employee Number | Last Name | First Name | Gender | Age | Start Date | Performance Rating | Department | Monthly Pay |
|---|---|---|---|---|---|---|---|---|
| 51 | Chin-Tsai | Fang | Male | 32 | 10/24/2007 | Poor | Sales | 3131 |
| 52 | Xiangyong | Wang | Male | 33 | 9/29/2007 | Satisfactory | Sales | 10098 |
| 53 | Fei | Meng | Male | 25 | 5/1/2009 | Satisfactory | Sales | 10882 |
| 54 | Humphrey | Willoughby | Male | 22 | 11/15/2008 | Star | Sales | 4025 |
| 83 | Andrew | Pereire | Male | 31 | 4/24/2009 | Average | Sales | 6815 |
| 84 | Morela | Castro | Female | 33 | 3/18/2009 | Exceeds Expect | Sales | 18061 |
| 136 | Vern | Ritchie | Male | 29 | 6/14/2005 | Average | Accounting | 8789 |
| 158 | Charles | Laurel | Female | 44 | 6/29/2005 | Average | Accounting | 2706 |
| 323 | Albert | Hesseneian | Male | 30 | 12/18/2004 | Average | Engineering | 13525 |
| 333 | Thomas | Schirmer | Male | 31 | 10/29/2008 | Average | Engineering | 2726 |

FIG. 14

FIG. 16
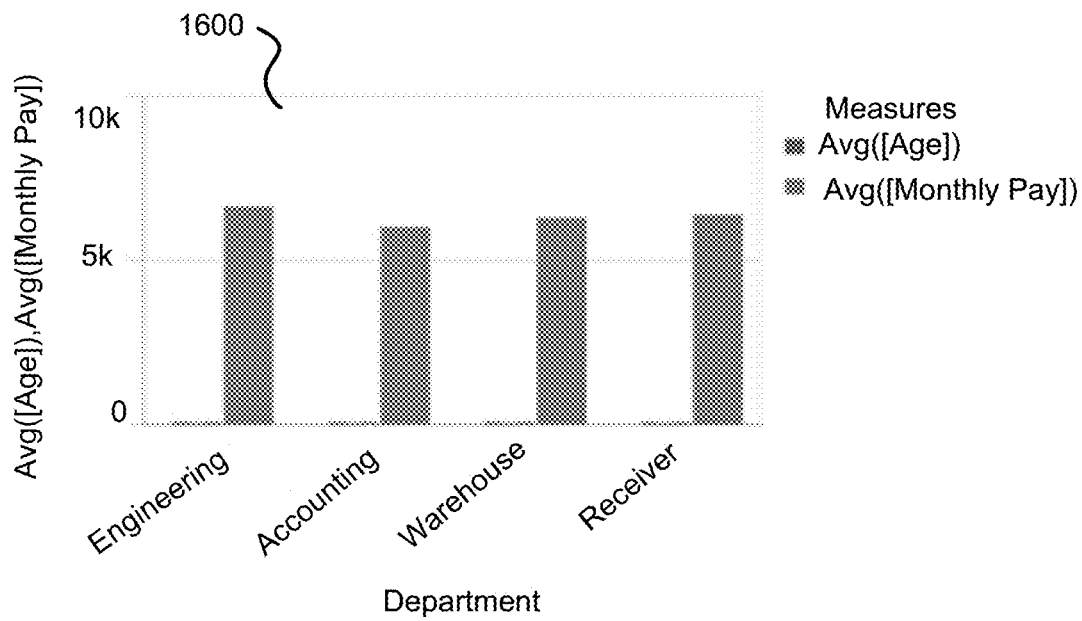
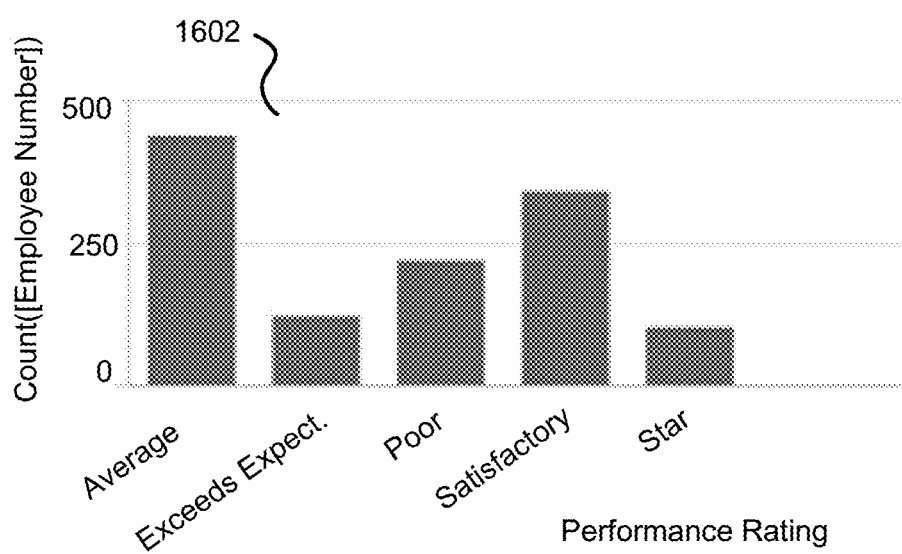

FIG. 17
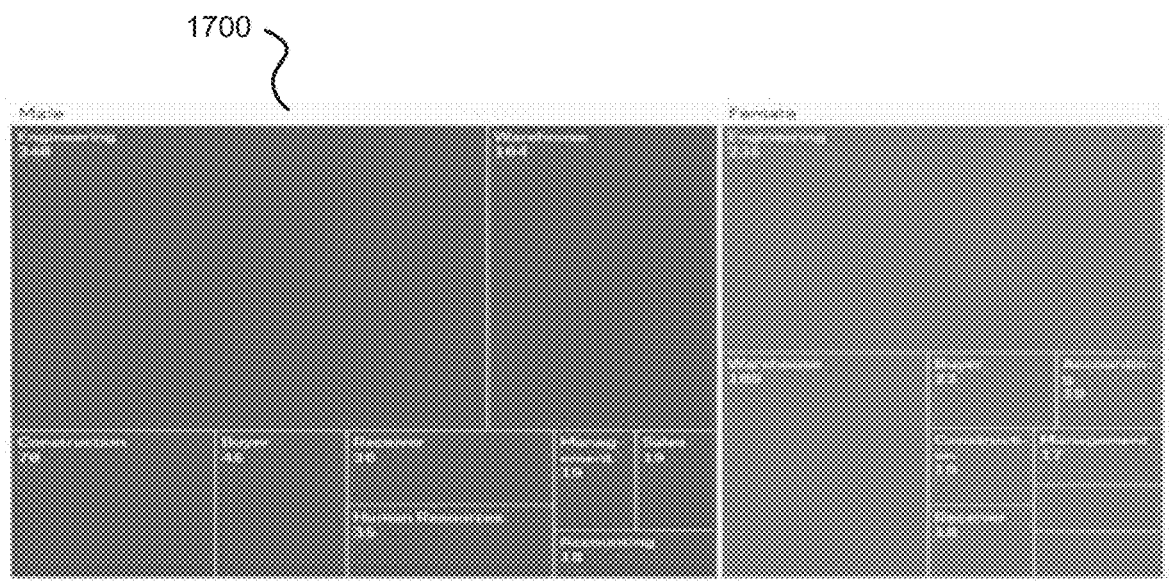
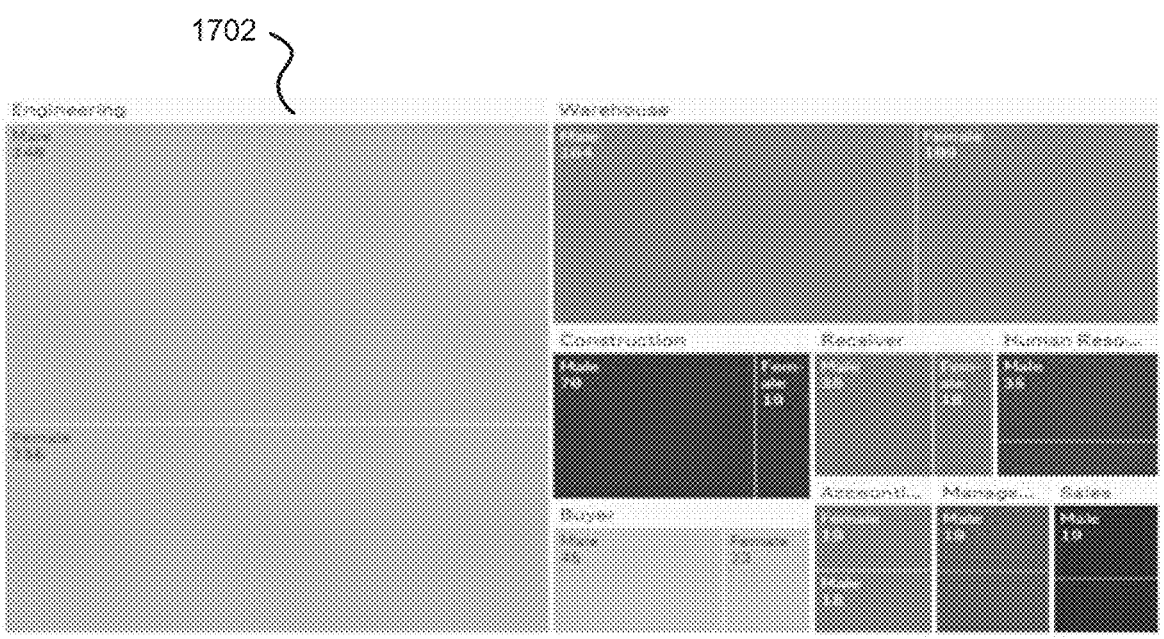

COGNITIVE RULE ENGINE

CROSS REFERENCE TO RELATED PATENT APPLICATION

This application claims priority to U.S. Provisional Application No. 62/505,691 filed May 12, 2017, herein incorporated by reference in its entirety.

SUMMARY

It is to be understood that both the following general description and the following detailed description are exemplary and explanatory only and are not restrictive, as claimed. Provided are methods and systems for data management and analysis.

In an aspect, provided is a method comprising monitoring one or more data analysis sessions, determining, based on the monitoring, a common data analysis technique performed across common data analysis sessions, identifying the common data analysis technique as a precedent, and providing the precedent to a precedent engine.

In a further aspect, provided is a method comprising monitoring a data analysis session, determining a feature of the data analysis session, determining that the feature of the data analysis session is associated with a precedent, and providing the precedent to the data analysis session.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4A is tables showing a final data structure, e.g. a multidimensional cube, created by evaluating mathematical functions;

FIG. 5B is an overview of the relations between data model, indexes in disk and windowed view of disk indexes in memory;

FIG. 6 is a schematic graphical presentation showing selections and a diagram of data associated to the selections as received after processing by an external engine;

FIG. 7 is a schematic representation of data exchanged with an external engine based on selections in FIG. 6;

FIG. 8 is a schematic graphical presentation showing selections and a diagram of data associated to the selections as received after second computations from an external engine;

FIG. 9 is a schematic representation of data exchanged with an external engine based on selections in FIG. 8;

FIG. 10 is a schematic graphical presentation showing selections and a diagram of data associated to the selections as received after third computations from an external engine;

FIG. 11 is a schematic representation of data exchanged with an external engine based on selections in FIG. 10;

FIG. 12 is a table showing results from computations based on different selections in the presentation of FIG. 10;

FIG. 14 is an example data set;

FIG. 16 illustrates example data visualizations;

FIG. 17 illustrates example data visualizations;

DETAILED DESCRIPTION

Figure 1:
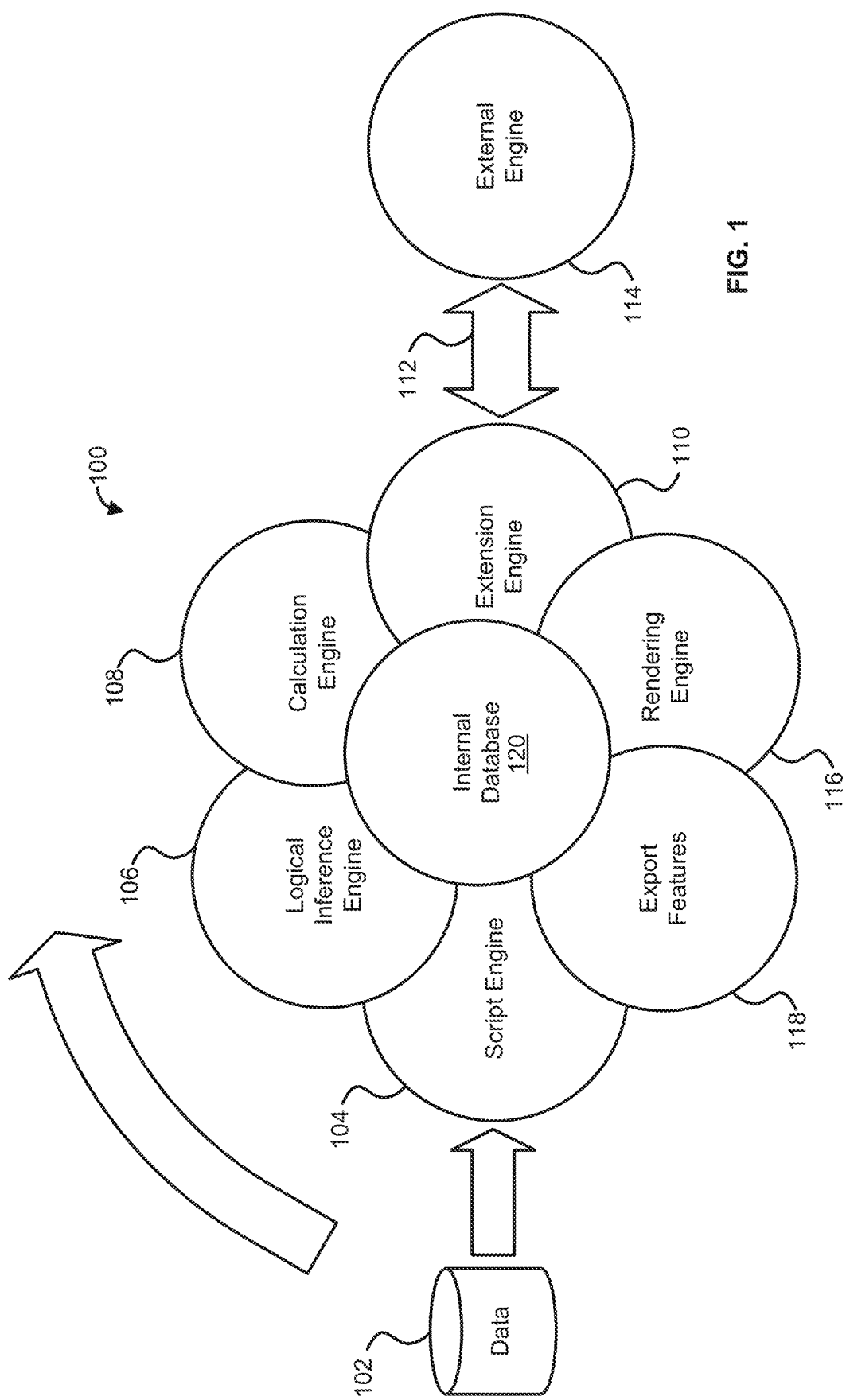
FIG. 1 is a schematic diagram showing an embodiment of system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to computer implemented methods and systems for data management, data analysis, and processing. The disclosed methods and systems can incorporate external data analysis into an otherwise closed data analysis environment. A typical environment for the systems and methods described herein is for assisting in a computer implemented method for building and updating a multi-dimensional cube data structure, such as, e.g., the systems and methods described in U.S. Pat. Nos. 7,058,621; 8,745,099; 8,244,741; and U.S. patent application Ser. No. 14/054,321, which are incorporated by reference in their entireties.

In an aspect, the methods and systems can manage associations among data sets with every data point in the analytic dataset being associated with every other data point in the dataset. Datasets can be larger than hundreds of tables with thousands of fields. A multi-dimensional dataset or array of data is referred to as an OnLine Analytic Processing (OLAP) cube. A cube can be considered a multi-dimensional generalization of a two- or three-dimensional spreadsheet. For example, it may be desired to summarize financial data by product, by time-period, and by city to compare actual and budget expenses. Product, time, city, and scenario (actual and budget) can be referred to as dimensions. A multi-dimensional dataset is normally called a hypercube if the number of dimensions is greater than 3. A hypercube can comprise tuples made of two (or more) dimensions and one or more expressions.

FIG. 1 illustrates an associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database, such as relational databases, post-relational databases, object-oriented databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

In an aspect, the extraction of the data can comprise extracting an initial data set or scope from the data source 102, e.g. by reading the initial data set into the primary memory (e.g. RAM) of the computer. The initial data set can comprise the entire contents of the data source 102 base, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a data set.

Once the data has been extracted, a user interface can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the data set, causing a logical inference engine 106 to evaluate a number of filters on the data set. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. An example, data model 501 is shown in FIG. 5B. The data model 501 illustrates connections between a plurality of tables which represent logical associations. Depending on the amount of data, the data model 501 can be too large to be loaded into memory. To address this issue, the logical inference engine 106 can generate one or more indexes for the data model. The one or more indexes can be loaded into memory in lieu of the data model 501. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Queries that compare for equality to a string can retrieve values very fast using a hash index. For instance, referring to the tables of FIG. 2, a query of SELECT*FROM Table 2 WHERE Client='Kalle') could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row.

As shown in FIG. 5B, the logical inference engine 106 can be configured for generating one or more bidirectional table indexes (BTI) 502a, 502b, 502c, 502d, and/or 502e and one or more bidirectional associative indexes (BAI) 503a, 503b, 503c and/or 503d based on a data model 501. The logical inference engine 106 can scan each table in the data model 501 and create the BTI 502a, 502b, 502c, 502d, and/or 502e. A BTI can be created for each column of each table in the data. The BTI 502a, 502b, 502e, 502d, and/or 502e can comprise a hash index. The BTI 502a, 502b, 502c, 502d, and/or 502e can comprise first attributes and pointers to the table rows comprising the first attributes. For example, referring to the tables of FIG. 2, an example BTI 502a can comprise "Kalle=>0x29838", where Kalle is an attribute found in Table 2 and 0x29838 is a reference to the row in Table 2 where Kalle is stored in memory. Thus, the BTI 502a, 502b, 502c, 502d, and/or 502e can be used to determine other attributes in other columns (e.g., second attributes, third attributes, etc . . . ) in table rows comprising the first attributes. Accordingly, the BTI can be used to determine that an association exists between the first attributes and the other attributes.

The logical inference engine 106 can scan one or more of BTI 502a, 502b, 502c, 502d, and/or 502e and create the BAI 503a, 503b, 503c and/or 503d. The BAI 503a, 503b, 503c and/or 503d can comprise a hash index. The BAI 503a, 503b, 503c and/or 503d can comprise an index configured for connecting attributes in a first table to common columns in a second table. The BAI 503a, 503b, 503c and/or 503d thus allows for identification of rows in the second table which then permits identification of other attributes in other tables. For example, referring to the tables of FIG. 2, an example BAI 503a can comprise "Kalle=>0x39838", where Kalle is an attribute found in Table 2 and 0x39838 is a reference to a row in Table 4 that contains Kalle. In an aspect, the reference can be to a hash that can be in-memory or on disk.

Using the BTI 502a, 502b, 502c, 502d, and/or 502e and the BAI 503a, 503b, 503c, and/or 503d, the logical inference engine 106 can generate an index window 504 by taking a portion of the data model 501 and mapping it into memory.

The portion of the data model 501 taken into memory can be sequential (e.g., not random). The result is a significant reduction in the size of data required to be loaded into memory.

In an aspect, bidirectional indexing using BTIs can have limits as to how much parallelization can be applied when processing the data model 501. To improve parallelization applied to the data model 501, the logical inference engine 106 can generate bidirectional indexes for partitions for a table in the data model 501. Such bidirectional indexes are hereinafter referred to as "indexlets." In an aspect, the logical inference engine 106 can generate indexlets for a given table by partitioning the table into blocks of rows. In an aspect, the blocks of rows can be of a same size. In an aspect, a last block of rows can be of a size less than the remaining blocks of rows. In an aspect, after partitioning the blocks of rows, the logical inference engine can generate an indexlet for each of the blocks of rows. In an aspect, generating an indexlet for a given block of rows comprises generating a bidirectional index as described above, but limited in scope to the given block of rows.

Provided the input data sources, the logical inference engine 106 can implement an indexation process (e.g., symbol indexation) to generates the indexlets. Indexlets thus generated can serve as a foundation for providing bi-directional indexing information for the both inferencing and/or hypercube domain calculation techniques.

Given an input data source 102 in an interpretable format, e.g., CSV, the indexation process can begin with partitioning the data source 102 into disjoint, same-sized blocks of rows. In some aspects, the indexation process will not partition the last row (e.g., the size of the last block might be smaller than the size of the other blocks). These "slices" of the data can be then processed independently to generate intermediate indexlet structures. Intermediate indexlet structures can be processed sequentially to generate a global symbol map. In addition to bi-directional information (symbol to row and row to symbol), a mapping between the symbols can reside locally in the indexlet and in the global symbol map. This mapping enables a simple yet fast and efficient transformation between symbols in an indexlet and in global symbol maps and vice versa through select and rank operations on bit vectors.

There are two main challenges to the indexation process: parallelization of the creation of intermediate indexlet structures and the creation and handling of large global symbol maps that contain potentially billions of symbols.

The indexation process can be divided into two components: an indexer service and a global symbol service. While the indexer service handles an indexation request as well as distributing tasks of creating the intermediate indexlet structures, the global symbol service enables splitting global symbol maps across machines. Even in good hash map implementations there is always overhead in memory consumption due to the management of the internal data structure. As result, the ability to split global symbol maps across machines helps to share the load as well as supporting both horizontal and vertical scaling when dealing with large data set.

Figure 4B:
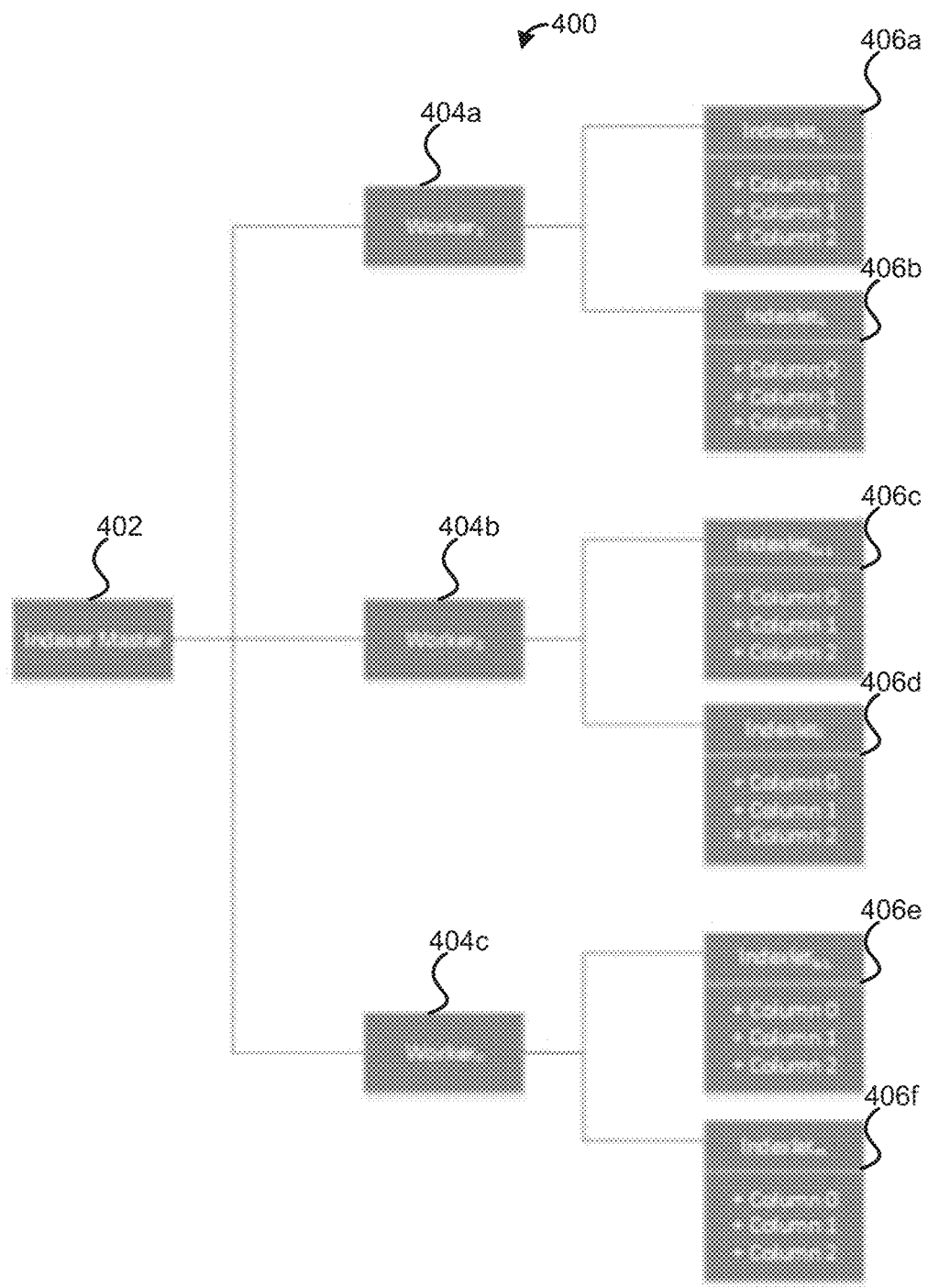
FIG. 4B illustrates an example indexation service.

In order to achieve the maximum parallelization of the creation of intermediate indexlet structures, the indexer service can utilize a distributed computing environment. FIG. 4B illustrates an indexation service 400. A master node 402 can comprise information regarding the capability of worker nodes 404a, 404b, and 404c registered during their initialization. On receiving an indexation request, the master node 402 distributes tasks to worker nodes 404a, 404b, and 404c based on the registered capability. In this setup, more worker nodes can be dynamically added and registered with the master node 402 to reduce the required creation time of the intermediate indexlet structures 406a, 406b, 406c, 406d, 406e, and 406f. Moreover, if a worker node dies during the process, a new worker node can be instantiated and registered to the master node 402 to take over the corresponding tasks. The master node 402 can also communicate with a global symbol master node to get global symbol maps initialized and ready for the global symbol service.

When dealing with large data sets, global symbol maps can comprise billions of symbols. Naturally, an in-memory hash map can provide better performance on both look up and insert operations in comparison to file-based hash map implementations. Unfortunately, it is not practical to have an unlimited amount of physical memory available. Although virtual memory can help to elevate the limitation of physical memory, the performance of look up and insert operations degrades dramatically.

A global symbol service is provided in which global symbol maps are split across machines to share the load as well as the stress on memory requirements while achieving the desired performance.

Figure 4C:
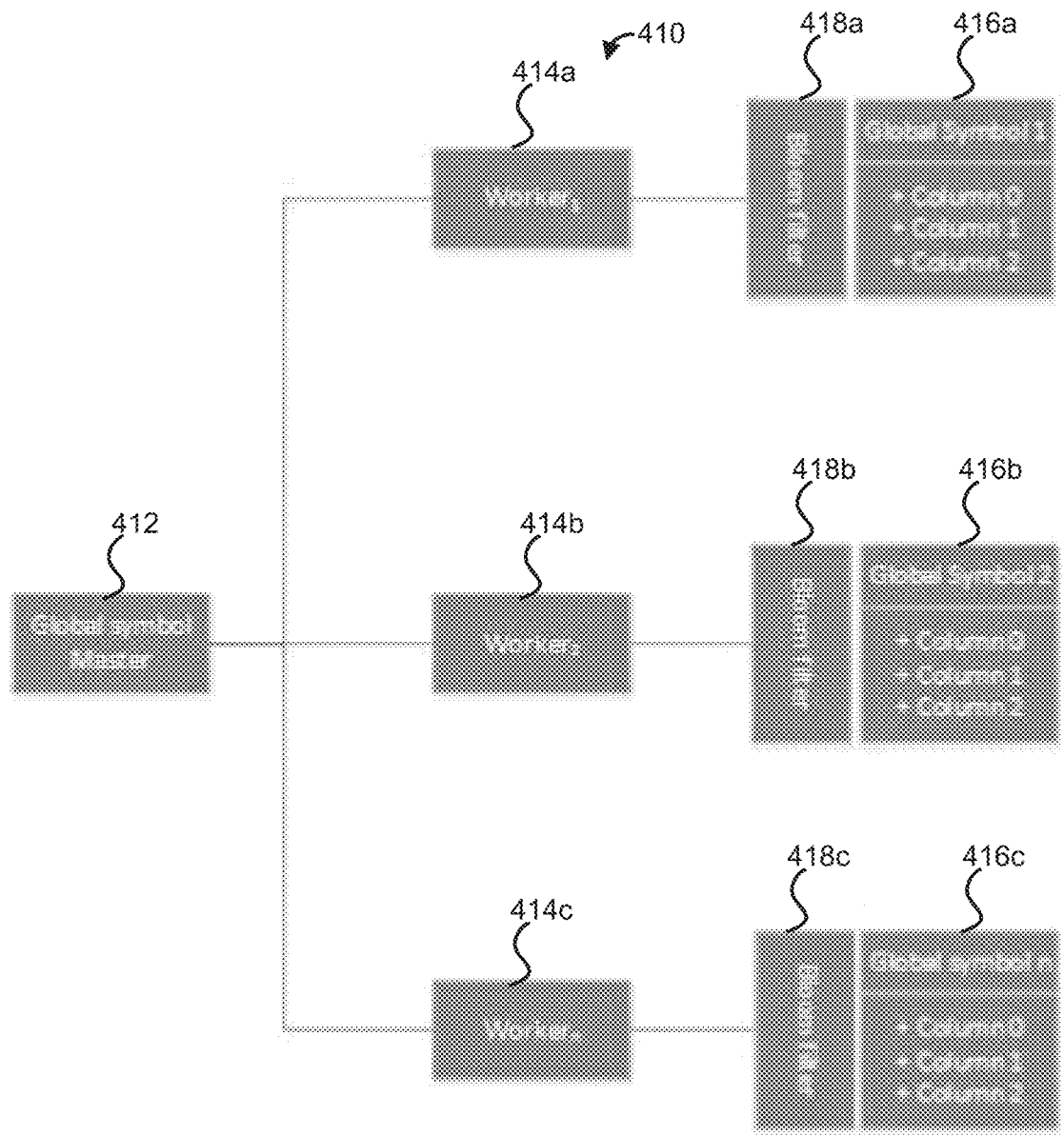
FIG. 4C illustrates an example global symbol service.

FIG. 4C illustrates a global symbol service 410. As shown in FIG. 4B, during an initialization process, worker nodes 414a, 414b, and 414c register their capabilities, e.g., amount of memory, processing power, bandwidth, etc, with a global master node 412. On receiving an indexation request, for example from the indexer master node 402, the global symbol master node 412 can request initialization of global symbol maps 416a, 416b, and 416c on worker nodes 414a, 414b, and 414c based on the registered capabilities. As a result, the global symbol maps 416a, 416b, and 416c are initialized and proper capability reserved accordingly.

The indexer service and the global symbol service can generate intermediate indexlet structures and process the intermediate indexlet structures sequentially to generate the global symbol maps together with bi-directional indexing information. This constraint on processing order permits fast and efficient mappings between symbols that reside locally in an indexlet and the global symbol maps. The global symbol service allows parallelism to improve indexation performance.

For example, a state, S, can be introduced into the global symbol maps 416a, 416b, and 416c on the worker nodes 414a, 414b, and 414c as follows S={standing_by, serving, closed} where "standing_by" indicates that the global symbol map on the worker node is not in use, "serving" indicates that the global symbol map on the worker node can be used for both look up and insert operations, "closed" indicates that the global symbol map on the worker node is full, and, thus, only supports a look up operation.

The creation of the global symbol map can start with inserting symbols into a serving hash map on the corresponding worker node. When the optimal capacity of the hash map is reached, the corresponding worker node informs the global symbol master node and changes its state to closed. The global symbol master node can then request another worker node to handle the upcoming tasks, e.g., changing the state of hash map from "standing_by" to "serving." On subsequent processes, look up operations can be carried out in a bulk and in a parallelized manner on a closed hash map to maximize the performance. The remaining new symbols can then be inserted into the serving hash map on the corresponding worker node. If a worker node in "standing_by" state dies during the process, it can be replaced by instantiating another worker node that registers itself to the master node. If a worker node in "closed" or "serving" state dies, it can be replaced by either another worker node in "standing_by" state or a newly instantiated worker node. In this case, the master node informs the indexer service and the range of the corresponding data will be indexed again to reconstruct the corresponding hash map.

In an aspect, a Bloom filter 418a, 418b, and 418c can be used to further optimize look up performance. A Bloom filter is a probabilistic data structure that can indicate whether an element either definitely is not in the set or may be in the set. In other words, false positive matches are possible, but false negatives are not. The base data structure of a Bloom filter is a bit vector. On a very large hash map that contains several billion symbols, the performance of the look up operation can degrade dramatically as the size increases. The Bloom filter is a compact data structure that can represent a set with an arbitrarily large number of elements. The Bloom filter enables fast querying of the existence of an element in a set. Depending on the registered resource information, the false positive rate can be specified to achieve both the compactness of the Bloom filter and the minimum access to the hash map. A Bloom filter can improve the performance of look up operation on closed hash map by 3 to 5 times. The constructed Bloom filter 418a, 418b, and 418c can be used to minimize the amount of communication required in the inferencing as well as hypercube domain construction process. Particularly, by performing look up operations in the Bloom filters 418a, 418b, and 418c first, the number of hash maps that possibly contain the desired information will be minimized, and, thus, reduce the number of requests that need to be transferred through the network.

The indexer service and the global symbol service allows both local as well as cloud based deployment of symbol indexation. With cloud-based deployment, more resources can be added to improve the indexation process. The indexation process is bounded by the amount of resources and the available bandwidth. In large scale deployment, direct communication between indexer worker nodes 404a, 404b, and 404c and global symbol worker nodes 414a, 414b, and 414c can be setup to reduce the load on the global symbol master node 412.

Figure 5A:
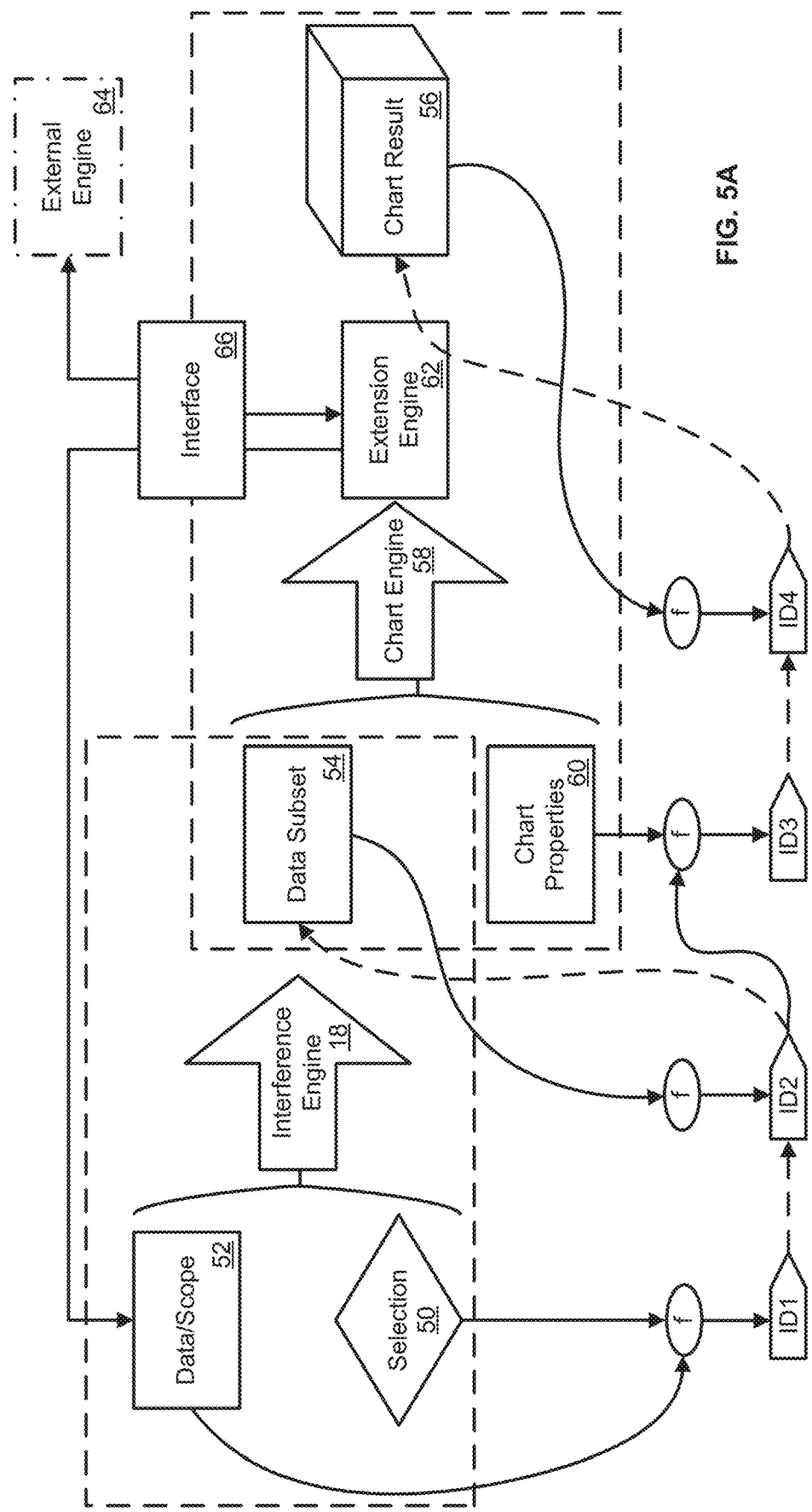
FIG. 5A is a schematic diagram showing how a selection by a user operates on a scope to generate a data subset.
Figure 5C:
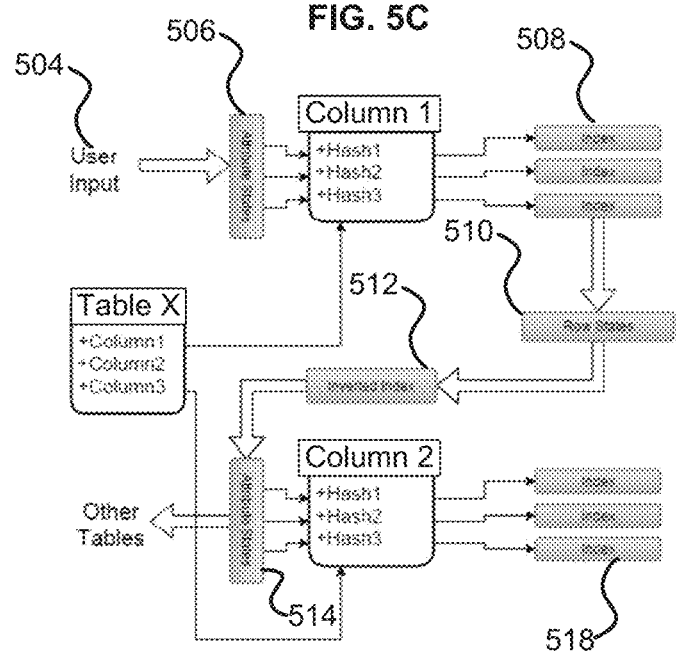
FIG. 5C is a representation of the data structure used for table handling.
Figure 5D:
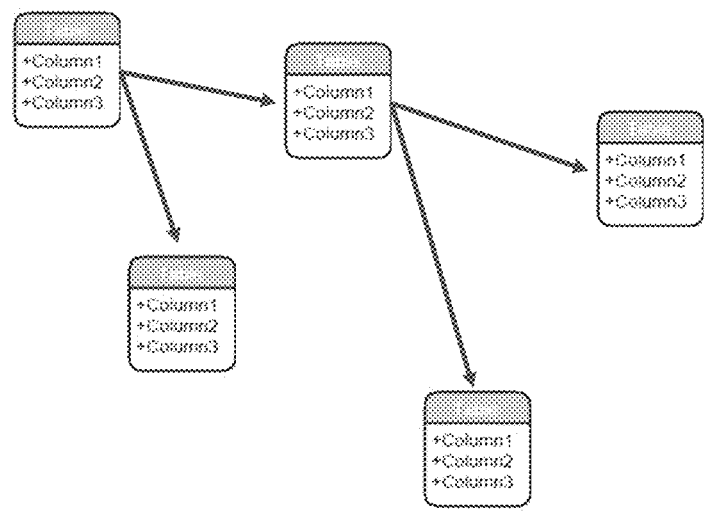
FIG. 5D is a table tree representation of a data model.
Figure 5E:
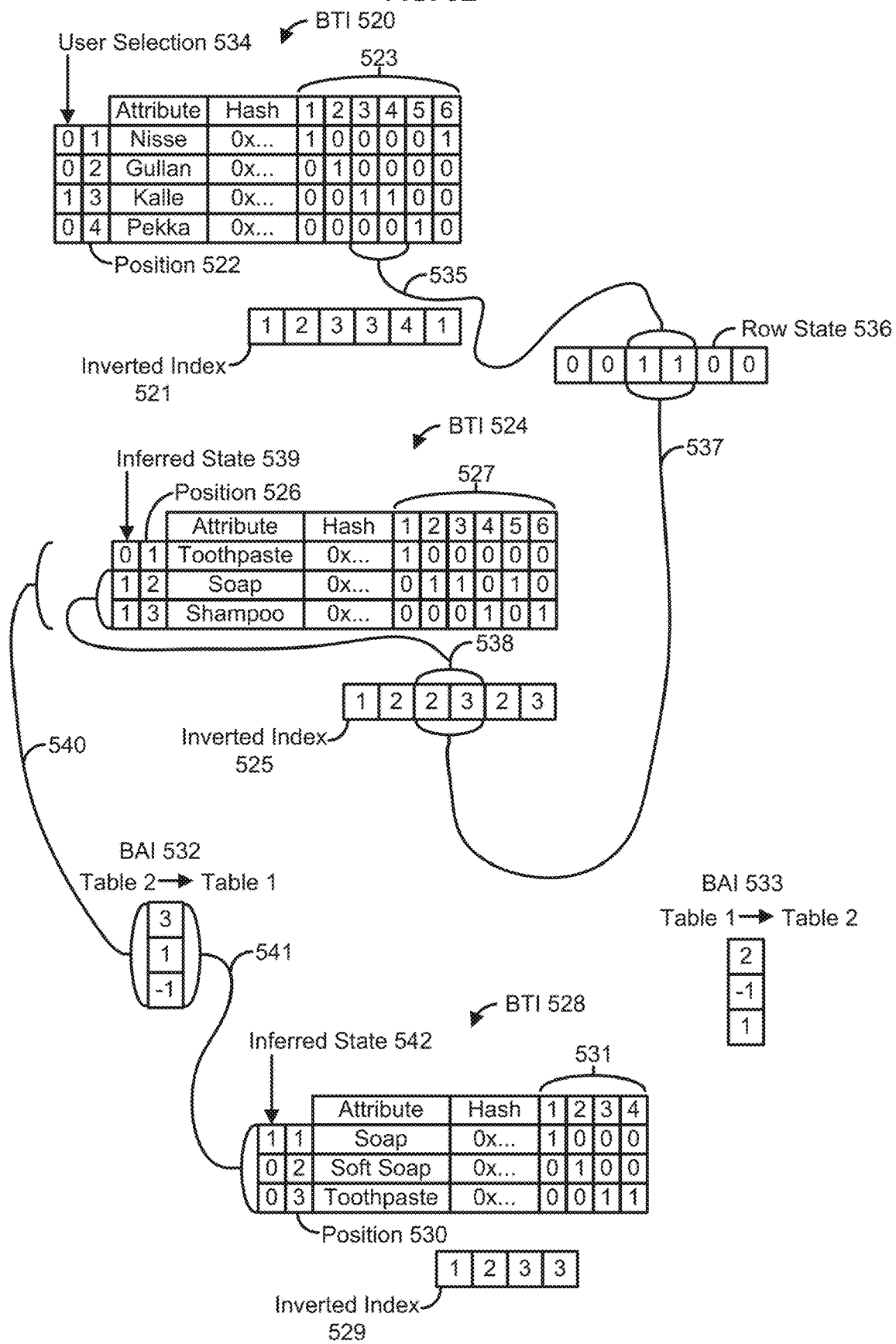
FIG. 5E illustrates an example application of bidirectional table indexes and bidirectional association indexes.
Figure 5F:
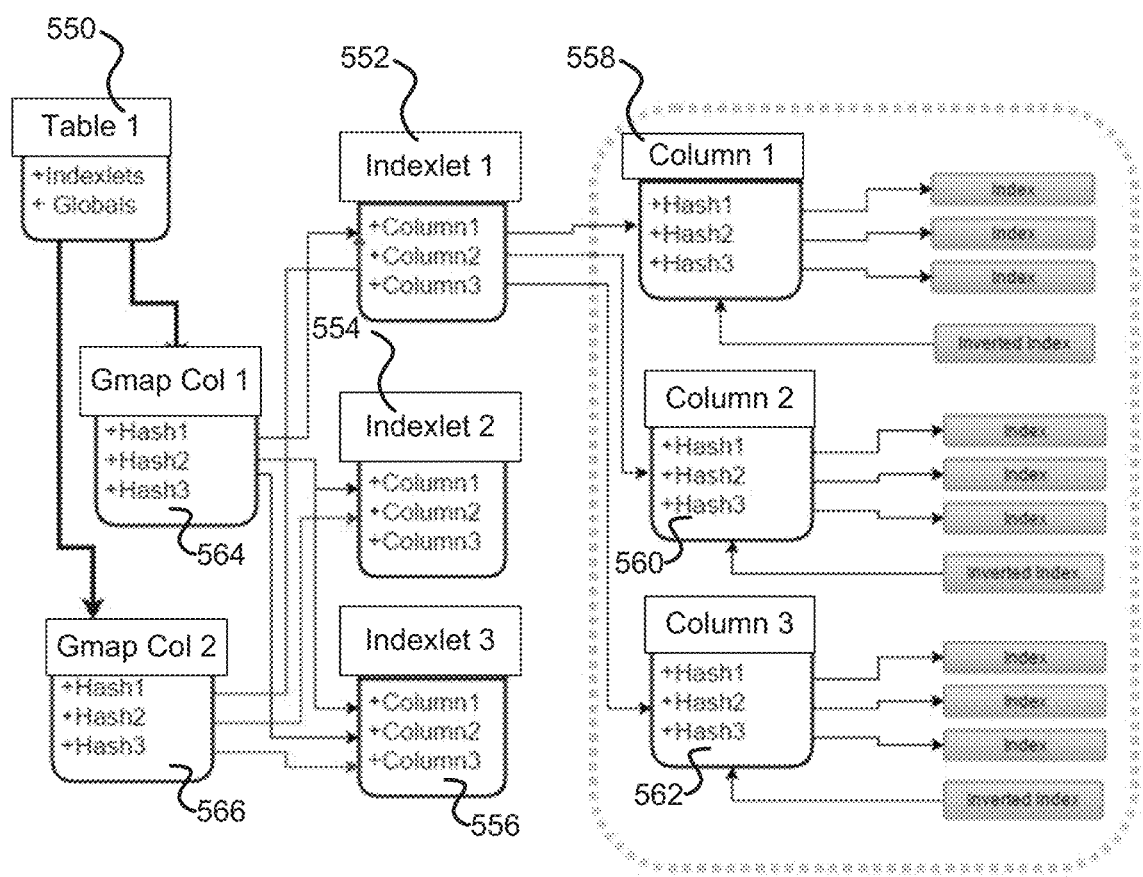
FIG. 5F is a representation of the data structure used for indexlets.

A representation of a data structure for indexlets is shown in FIG. 5F. Rows of a given table 550 can be divided into block bidirectionally indexed by indexlets 552, 554 and 556, respectively. In the example of FIG. 5F, the indexlet 552 can include pointers or references to respective columns 558, 560, and 562 as set forth above with respect to bidirectional table indexes. Each of the indexlets 552, 554, and 556 are logically associated with a bidirectional global attribute lists 564 and 566 that index a particular attribute to the blocks it is present in. Accordingly, an entry in the bidirectional global attribute list 564 and 566 for a given attribute can comprise a reference to an indexlet corresponding to a block having the respective attribute. In an aspect, the reference can include a hash reference. In an aspect, as shown in FIG. 5H, an implicit relationship exists between indexlets in different tables through a common field present in both tables and an attribute-to-attribute (A2A) index.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

FIG. 5C illustrates an example application of one or more BTIs. User input 504 can be received that impacts a selection of one or more attribute states 506. Attribute states 506 can correspond to selection by a user of one or more attributes (e.g., values) found in Column 1 of Table X. In an aspect, the one or more attributes of Table X can comprise a hash of each respective attribute. One or more BTI's 508 can be accessed to determine one or more rows in Table X that comprise the attributes selected by the user. Row states 510 can correspond to selection of one or more rows found in Table X that comprise the one or more selected attributes. An inverted index 512 of Column 2 can be accessed to identify which rows of Table 1 comprise associated attributes. Attribute states 514 for Column 2 can be updated to reflect the associated attributes of Column 2. One or more BTI's 518 can be further accessed to determine other associated attributes in other columns as needed. Attribute states 514 can be applied to other tables via one or more BAIs. FIG. 5D illustrates an example of relationships identified by one or more BAIs.

Figure 2:
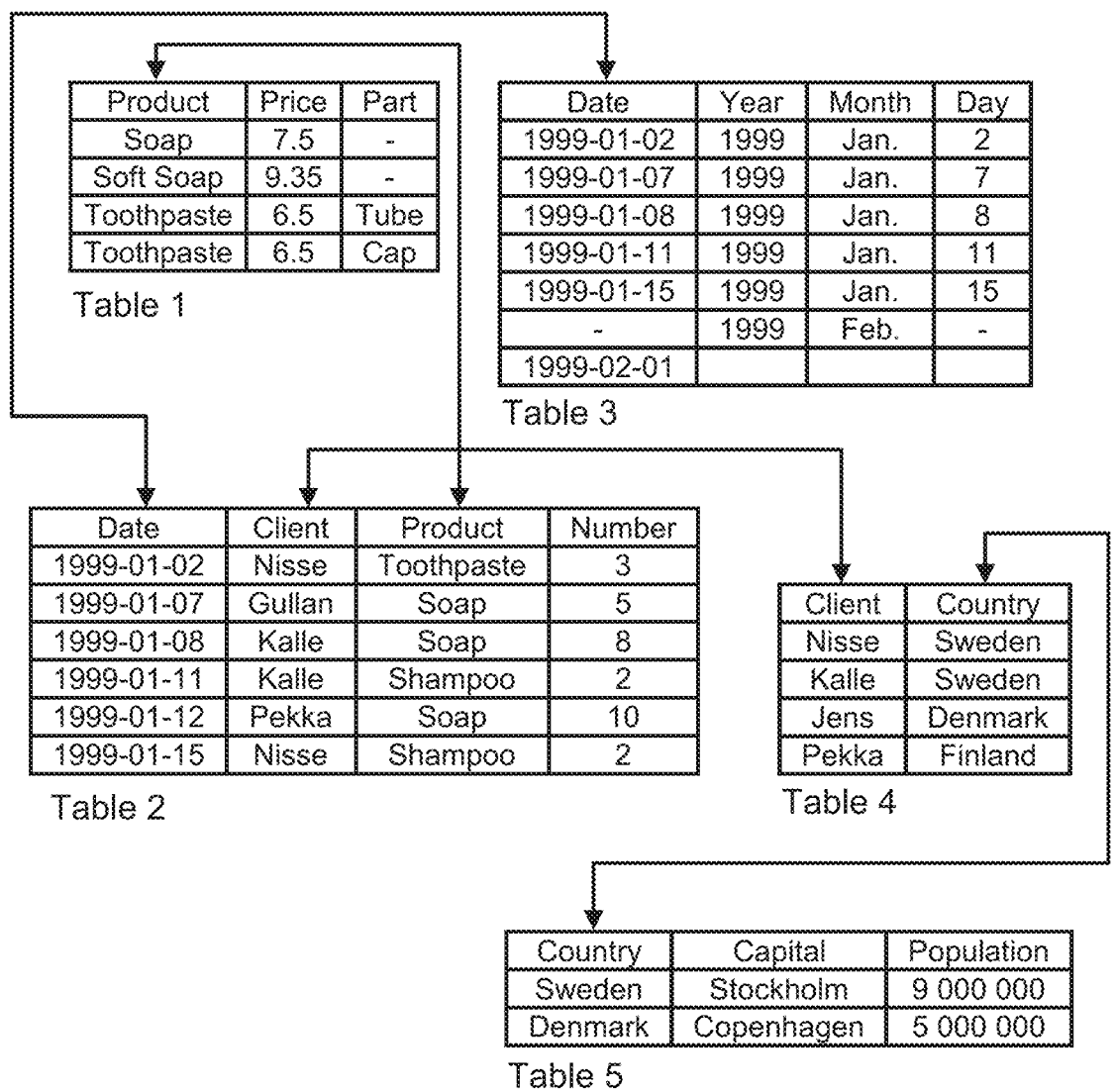
FIG. 2 is a set of tables showing exemplary Tables 1-5 of a simple database and associations between variables in the tables.

FIG. 5E illustrates an example application of BTI's and BAI's to determine inferred states both inter-table and intra-table using Table 1 and Table 2 of FIG. 2. A BTI 520 can be generated for the "Client" attribute of Table 2. In an aspect, the BTI 520 can comprise an inverted index 521. In other aspect, the inverted index 521 can be considered a separate structure. The BTI 520 can comprise a row for each unique attribute in the "Client" column of Table 2. Each unique attribute can be assigned a corresponding position 522 in the BTI 520. In an aspect, the BTI 520 can comprise a hash for each unique attribute. The BTI 520 can comprise a column 523 for each row of Table 2. For each attribute, a "1" can indicate the presence of the attribute in the row and a "0" can indicate an absence of the attribute from the row, "0" and "1" are merely examples of values used to indicate presence or absence. Thus, the BTI 520 reflects that the attribute "Nisse" is found in rows 1 and 6 of Table 2, the attribute "Gullan" is found in row 2 of Table 2, the attribute "Kalle" is found in rows 3 and 4 of Table 2, and the attribute "Pekka" is found in row 5 of Table 2.

The inverted index 521 can be generated such that each position in the inverted index 521 corresponds to a row of Table 2 first position corresponds to row 1, second position corresponds to row 2, etc . . . ). A value can be entered into each position that reflects the corresponding position 522 for each attribute. Thus, in the inverted index 521, position 1 comprises the value "1" which is the corresponding position 522 value for the attribute "Nisse", position 2 comprises the value "2" which is the corresponding position 522 value for the attribute "Gullan", position 3 comprises the value "3"

which is the corresponding position 522 value for the attribute "Kalle", position 4 comprises the value "3" which is the corresponding position 522 value for the attribute "Kalle", position 5 comprises the value "4" which is the corresponding position 522 value for the attribute "Pekka", and position 6 comprises the value "1" which is the corresponding position 522 value for the attribute "Nisse".

A BTI 524 can be generated for the "Product" attribute of Table 2. In an aspect, the BTI 524 can comprise an inverted index 525. In other aspect, the inverted index 525 can be considered a separate structure. The BTI 524 can comprise a row for each unique attribute in the "Product" column of Table 2. Each unique attribute can be assigned a corresponding position 526 in the BTI 524. In an aspect, the BTI 524 can comprise a hash for each unique attribute. The BTI 524 can comprise a column 527 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 524 reflects that the attribute "Toothpaste" is found in row 1 of Table 2, the attribute "Soap" is found in rows 2, 3, and 5 of Table 2, and the attribute "Shampoo" is found in rows 4 and 6 of Table 2.

By way of example, the inverted index 525 can be generated such that each position in the inverted index 525 corresponds to a row of Table 2 (e.g., first position corresponds to row 1, second position corresponds to row 2, etc . . . ). A value can be entered into each position that reflects the corresponding position 526 for each attribute. Thus, in the inverted index 525, position 1 comprises the value "1" which is the corresponding position 526 value for the attribute "Toothpaste", position 2 comprises the value "2" which is the corresponding position 526 value for the attribute "Soap", position 3 comprises the value "2" which is the corresponding position 526 value for the attribute "Soap", position 4 comprises the value "3" which is the corresponding position 526 value for the attribute "Shampoo", position 5 comprises the value "2" which is the corresponding position 526 value for the attribute "Soap", and position 6 comprises the value "3" which is the corresponding position 526 value for the attribute "Shampoo".

By way of example, a BTI 528 can be generated for the "Product" attribute of Table 1. In an aspect, the BTI 528 can comprise an inverted index 529. In other aspect, the inverted index 529 can be considered a separate structure. The BTI 528 can comprise a row for each unique attribute in the "Product" column of Table 1. Each unique attribute can be assigned a corresponding position 530 in the BTI 528. In an aspect, the BTI 528 can comprise a hash for each unique attribute. The BTI 528 can comprise a column 531 for each row of Table 1. For each attribute, a "1" can indicate the presence of the attribute in the row and a "0" can indicate an absence of the attribute from the row. "0" and "1" are merely examples of values used to indicate presence or absence. Thus, the BTI 528 reflects that the attribute "Soap" is found in row 1 of Table 1, the attribute "Soft Soap" is found in row 2 of Table 1, and the attribute "Toothpaste" is found in rows 3 and 4 of Table 1.

By way of example, the inverted index 529 can be generated such that each position in the inverted index 529 corresponds to a row of Table 1 (e.g., first position corresponds to row 1, second position corresponds to row 2, etc . . . ). A value can be entered into each position that reflects the corresponding position 530 for each attribute. Thus, in the inverted index 529, position 1 comprises the value "1" which is the corresponding position 530 value for the attribute "Soap", position 2 comprises the value "2" which is the corresponding position 530 value for the attribute "Soft Soap", position 3 comprises the value "3" which is the corresponding position 530 value for the attribute "Toothpaste", and position 4 comprises the value "3" which is the corresponding position 530 value for the attribute "Toothpaste".

By way of example, a BAI 532 can be generated as an index between the product attribute of Table 2 and Table 1. The BAI 532 can comprise a row for each unique attribute in the BTI 524 by order of corresponding position 526. The value in each row can comprise the corresponding position 530 of the BTI 528. Thus, position 1 of the BAI 532 corresponds to "Toothpaste" in the BTI 524 (corresponding position 526 of 1) and comprises the value "3" which is the corresponding position 530 for "Toothpaste" of the BTI 528. Position 2 of the BAI 532 corresponds to "Soap" in the BTI 524 (corresponding position 526 of 2) and comprises the value "1" which is the corresponding position 530 for "Soap" of the BTI 528. Position 3 of the BAI 532 corresponds to "Shampoo" in the BTI 524 (corresponding position 526 of 3) and comprises the value "−1" which indicates that the attribute "Shampoo" is not found in Table 1.

By way of example, a BAI 533 can be created to create an index between the product attribute of Table 1 and Table 2. The BAI 533 can comprise a row for each unique attribute in the BTI 528 by order of corresponding position 530. The value in each row can comprise the corresponding position 526 of the BTI 524. Thus, position 1 of the BAI 533 corresponds to "Soap" in the BTI 528 (corresponding position 530 of 1) and comprises the value "2" which is the corresponding position 526 for "Soap" of the BTI 524. Position 2 of the BAI 533 corresponds to "Soft Soap" in the BTI 528 (corresponding position 530 of 2) and comprises the value "−1" which indicates that the attribute "Soft Soap" is not found in Table 2. Position 3 of the BAI 533 corresponds to "Toothpaste" in the BTI 528 (corresponding position 530 of 3) and comprises the value "1" which is the corresponding position 526 for "Toothpaste" of the BTI 524.

FIG. 5E illustrates an example application of the logical inference engine 106 utilizing the BTI 520, the BTI 524, and the BTI 528. A user can select the "Client" "Kalle" from within a user interface. A column for a user selection 534 of "Kalle" can be indicated in the BTI 520 comprising a value for each attribute that reflects the selection status of the attribute. Thus, the user selection 534 comprises a value of "0" for the attribute "Nisse" indicating that "Nisse" is not selected, the user selection 534 comprises a value of "0" for the attribute "Gullan" indicating that "Gullan" is not selected, the user selection 534 comprises a value of "1" for the attribute "Kalle" indicating that "Kalle" is selected, and the user selection 534 comprises a value of "0" for the attribute "Pekka" indicating that "Pekka" is not selected.

The BTI 520 can be consulted to determine that the attribute "Kalle" has a value of "1" in the column 523 corresponding to rows 3 and 4. In an aspect, the inverted index 521 can be consulted to determine that the user selection 534 relates to the position 522 value of "3" which is found in the inverted index 521 at positions 3 and 4, implicating rows 3 and 4 of Table 1. Following path 535, a row state 536 can be generated to reflect the user selection 534 as applied to the rows of Table 2. The row state 536 can comprise a position that corresponds to each row and a value in each position reflecting whether a row was selected. Thus, position 1 of the row state 536 comprises the value "0" indicating that row 1 does not contain "Kalle", position 2 of the row state 536 comprises the value "0" indicating that row 2 does not contain "Kalle", position 3 of the row state 536 comprises the value "1" indicating that row 3 does contain "Kalle", position 4 of the row state 536 comprises the value "1" indicating that row 4 does contain "Kalle", position 5 of the row state 536 comprises the value "0" indicating that row 5 does not contain "Kalle", and position 6 of the row state 536 comprises the value "0" indicating that row 6 does not contain "Kalle".

Following path 537, the row state 536 can be compared with the inverted index 525 to determine the corresponding position 526 contained in the inverted index 525 at positions 3 and 4. The inverted index 525 comprises the corresponding position 526 value of "2" in position 3 and the corresponding position 526 value of "3" in position 4. Following path 538, the corresponding position 526 values of "2" and "3" can be determined to correspond to "Soap" and "Shampoo" respectively in the BTI 524. Thus, the logical inference engine 106 can determine that both "Soap" and "Shampoo" in Table 2 are associated with "Kalle" in Table 2. The association can be reflected in an inferred state 539 in the BTI 524. The inferred state 539 can comprise a column with a row for each attribute in the BTI 524. The column can comprise a value indicated the selection state for each attribute. The inferred state 539 comprises a "0" for "Toothpaste" indicating that "Toothpaste" is not associated with "Kalle", the inferred state 539 comprises a "1" for "Soap" indicating that "Soap" is associated with "Kalle", and inferred state 539 comprises a "1" for "Shampoo" indicating that "Shampoo" is associated with "Kalle".

Following path 540, the inferred state 539 can be compared to the BAI 532 to determine one or more associations between the selection of "Kalle" in Table 2 and one or more attributes in Table 1. As the inferred state 539 comprises a value of "1" in both position 2 and position 3, the BAI 532 can be assessed to determine the values contained in position 2 and position 3 of the BAI 532 (following path 541). Position 2 of the BAI 532 comprises the value "1" which identifies the corresponding position 530 of "Soap" and position 3 of the BAI 532 comprises the value "−1" which indicates that Table 1 does not contain "Shampoo". Thus, the logical inference engine 106 can determine that "Soap" in Table 1 is associated with "Kalle" in Table 2. The association can be reflected in an inferred state 542 in the BTI 528. The inferred state 542 can comprise a column with a row for each attribute in the BTI 528. The column can comprise a value indicated the selection state for each attribute. The inferred state 542 comprises a "1" for "Soap" indicating that "Soap" is associated with "Kalle", the inferred state 542 comprises a "0" for "Soft Soap" indicating that "Soft Soap" is not associated with "Kalle", and the inferred state 542 comprises a "0" for "Toothpaste" indicating that "Toothpaste" is not associated with "Kalle". Based on the current state of BTIs and BAIs, if the data sources 102 indicate that an update or delta change has occurred to the underlying data, the BTIs and BAIs can be updated with corresponding changes to maintain consistency.

In aspects implementing indexlets, the logical inference engine 106 can apply query language by first performing intra-table inferencing on respective tables. Intra-table inferencing comprises transferring the imposed state of one field to other fields within the same table. In an aspect, intra-table inferencing can comprise computing the union of the index of the active attributes in a user input 504. The intersection of the result of the union operation and record states (i.e. row states 510) is then determined. This result is then intersected with the attribute states 514 of other columns using the inverted index 512. If other selection vectors from a previously provided user input vector 504 has zero active entries, a conflict can be detected. In an aspect, the logical inference engine 106 can resolve the detected conflict. In an aspect, resolving a conflict can include deleting or otherwise eliminating one or more incompatible selections. In another aspect, resolving a conflict can include reverting the data model 501 or a portion of the data model 501, e.g. a table, record, or attribute, to a previous state.

Figure 5G:
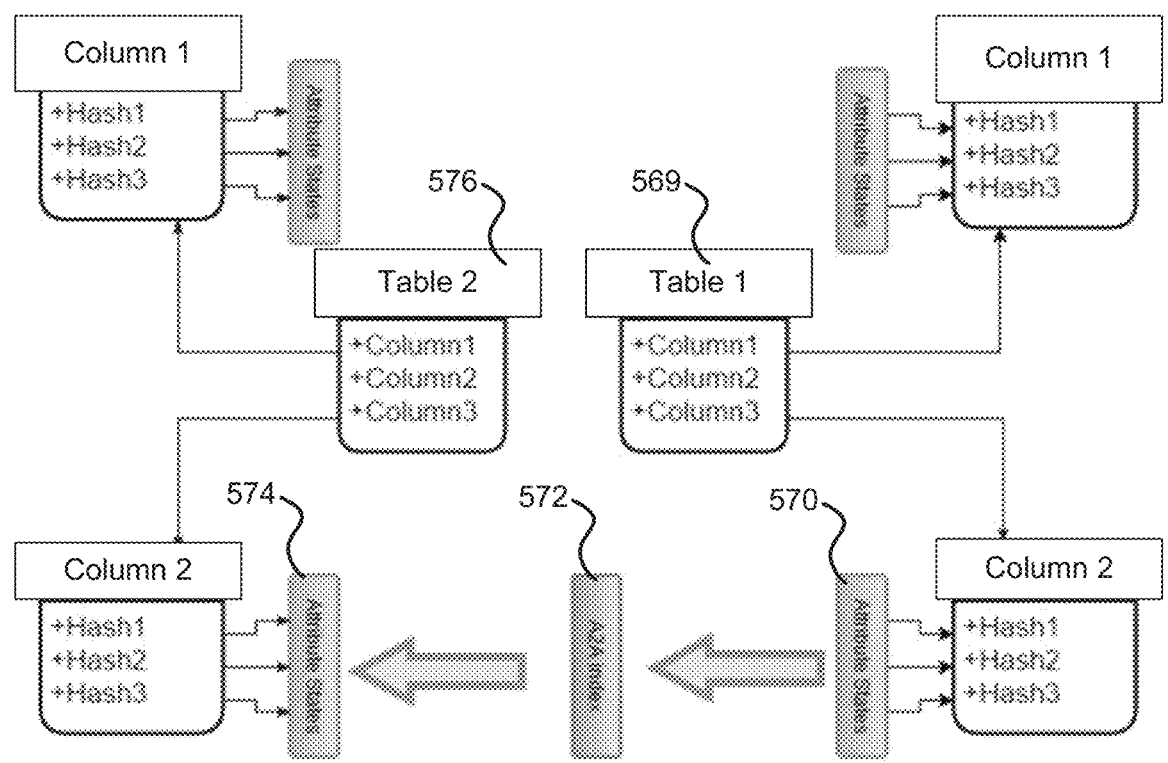
FIG. 5G illustrates an example of inter-table inferencing using indexlets.
Figure 5H:
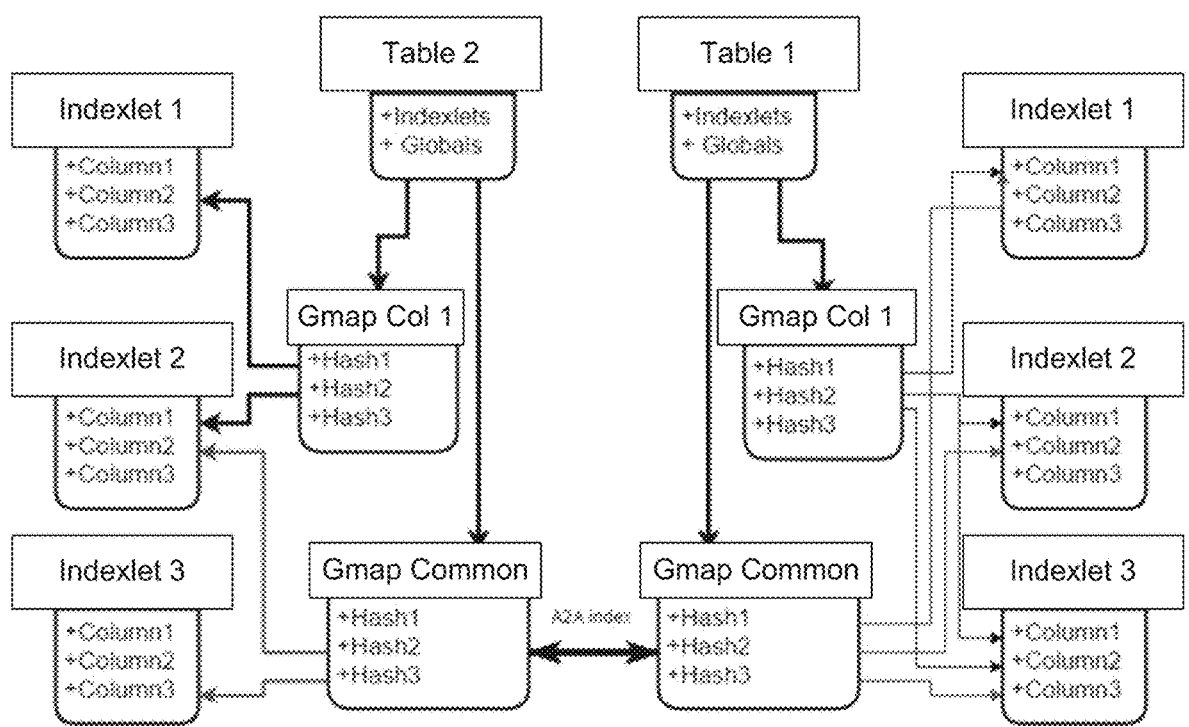
FIG. 5H illustrates an example of linking indexlets of different tables.

In an aspect, after performing intra-table inferencing, the logical inference engine 106 can perform inter-table inferencing based on the intra-table inferencing output of a plurality of tables, as is depicted in FIG. 5G. In an aspect, intra-table inferencing can include transferring a common field attribute of one table 569 to a child in its branch. In an aspect, this can be performed by running the attribute states 570 output from intra-table inferencing through an attribute-to-attribute (A2A) index 572 referencing the attribute states 574 in a second table 576. In an aspect, the A2A index 572 can be partitioned into one or more indexlets as described herein with respect to other data tables. In another aspect, transferring a common field attribute of one table 569 to a child in its branch by running the attribute states 570 output from intra-table inferencing through a function or logic performing similar functionality as the A2A index 572. For example, a function, service, or other logic can accept as input a pair of symbols and return an indication of whether or not they are related, e g. TRUE or FALSE. In another aspect, attribute-to-attribute relations can be indicated by user input.

Based on current selections and possible rows in data tables a calculation/chart engine 108 can calculate aggregations in objects forming transient hyper cubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

Figure 5I:
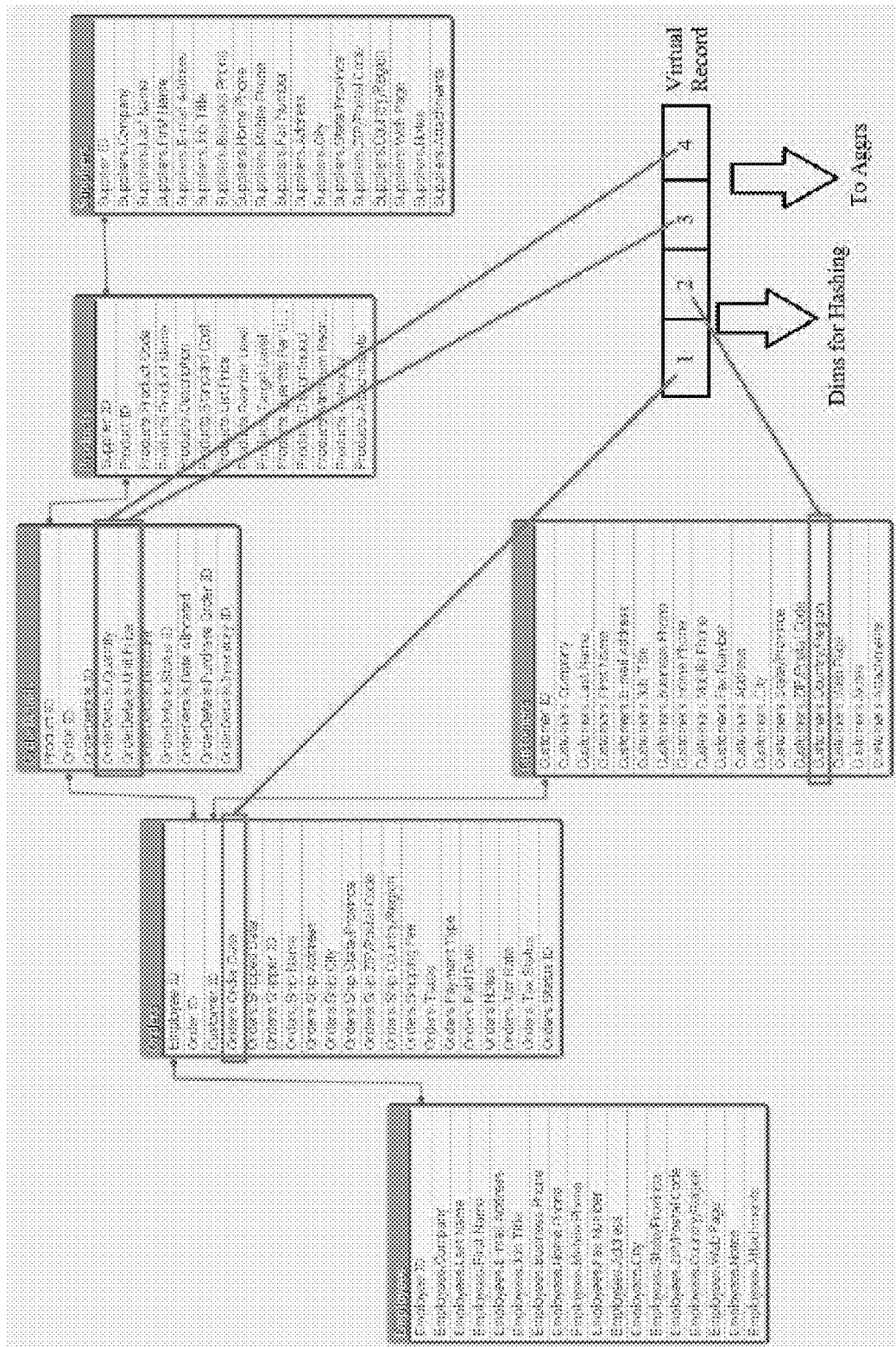
FIG. 5I illustrates an example virtual record.

In an aspect, the chart engine 108 can receive dimensions, expressions, and sorting parameters and can compute a hypercube data structure containing aggregations along the dimensions. For example, a virtual record can be built with a placeholder for all field values (or indices) needed, as a latch memory location. When all values are assigned, the virtual record can be processed to aggregate the fields needed for computations and save the dimension values in a data structure per row of the resulting hypercube. In such a way, the traversal of the database can be done in an arbitrary way, just depending on requirements provided by memory consumption and indexing techniques used for the particular case at hand. An example virtual record is shown in FIG. 5I. This example considers the dimensions Order Date and Country/Region and the expression sum(Unit Price*Quantity).

Figure 5J:
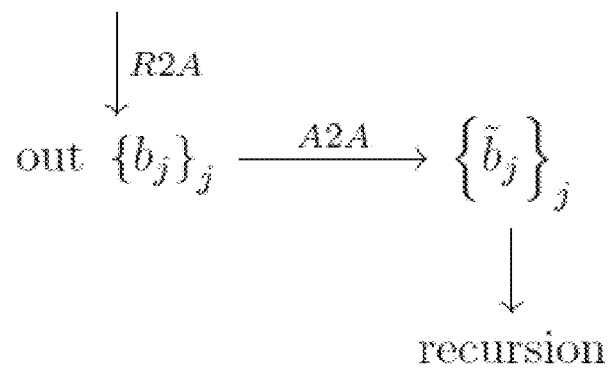
FIG. 5J illustrates an example method for database traversals.

The chart engine 108 can use indices to build hypercube domains. For example, using bidirectional indexing, walking the database for traversals can be performed as shown in FIG. 5J. A recursion algorithm starts with a consistently computed state. A "forest" covering the data model can be constructed and the "roots" of the "trees" can be either the largest table in the tree or one table containing the first needed field. Starting from that point, the database can be (naively) traversed as follows. Initially, virtual record fields present in the current table can be checked and saved in a list of local fields. An active attribute $a_i$ can be taken from the input field (e.g., iteratively). Using the A2R index, the record set $\{r_k\}_k$ associated to that symbol can be identified. The chart engine 108 can assign for every $r_k$, the virtual record entries present in the local field list. If the virtual record is totally assigned, the virtual record can be processed. The chart engine 108 can go to next symbol. Using R2S on the output field, the chart engine 108 can find corresponding attribute $b_j$. Using the A2A index, the chart engine 108 can translate $b$ to the next-in-branch table $\tilde{b}_j$. The chart engine 108 can then perform this same process with $\tilde{b}_j$ as input. While the preceding operations are on the global symbol maps, the impact on respective indexlets is included in the scheduling planning. Parallelisation of hypercube traversal is also possible for common aggregation linear operators, as described below.

The hypercube domain can be paged. The traversal can be stopped at any point by saving the state defined in the virtual record, and the tables being traversed at that point.

Expressions are strings representing which operations to be done on fields from the database. So, consider the field set $S=\{S_0, S_1, S_2, \ldots, S_n\}$ of the database. This is the union of all possible attributes per column, and those associated are included within the same set under a unique symbol. The part of an expression that is the subset of $\tilde{S} \subset S$ can be used for computing the values. Furthermore, the property of globality of the expression, e.g., the expression requiring all records to be available, can be taken into account when evaluating the expression.

Provided herein is a hypercube taxonomy. Two attributes $x_i \in S_i$, $x_j \in S_j$ can be defined as associated if the inference engine 106 can create a connected path between the attributes. Such can be denoted as $x_i \sim x_j$. Consider the space of virtual records on $\hat{S} \subset S$ as $$R_v^{\hat{S}} = \{r=(x_1,x_2,\ldots,x_k) | x_i \in S_i \wedge x_i \sim x_j \forall i,j\}$$

Subsequently, the dimension set can be defined as $$Dim = R_v^{\hat{S}}$$

where $\hat{S}$ is the set of dimensions defined to compute the hypercube. This set is naturally provided with an enumeration of all its elements where i is mapped to a unique element, denoted by $Dim^i$. Furthermore, provided some expression and its corresponding computation set $\tilde{s}$, the hypercube domain can be defined as
$\mathcal{X} = R_v^{(\hat{S}, \tilde{S})}$
X has a natural partition $$\mathcal{X} = \bigcup_i \mathcal{X}_i, \mathcal{X}_i = \{r \in X | x_j = Dim^i(j), j=0, \ldots, k\}$$

The hypercube problem can then be formulated as follows. Consider Dim and X together with I: $\mathcal{X}^k \to \mathcal{R}^n$, F: $\mathcal{R}^n \to \mathcal{R}^p$ with p=#(X), the problem becomes computing $$(F \circ I)(\mathcal{X}) = \sum_i (f_i \circ I)(\mathcal{X}) e_i$$

with $e_i$ the canonical vector with just 1 in i-th position, from the data model as quickly as possible. The hypercube problems can now be classified according to the characteristics of the expressions and the record domains. Some cases are inherently dependent of each other while others are parallelisable. Classifications include, for example, a component independent operator:

$$(F \circ I)(\mathcal{X}) = \sum_i (f \circ I)(\mathcal{X}_i) e_i;$$

a summable operator:

$$(F \circ I)(\mathcal{X}) = \sum_i \sum_{x \in \mathcal{X}_i} (f \circ I)(\{x\}) e_i;$$

and a recursive operator:

$$(f_{i+1} \circ I)(\mathcal{X}) = g\left(\mathcal{X}_{i+1}, \sum_{j=0}^{i} (f_i \circ I)(\mathcal{X}_j)\right).$$

This algebra works with strings, if string concatenation is regarded as sum.

The objective can be to minimize I/O by grouping results by indexlet, and distributing the work accordingly. The workload can be distributed considering the partition $X_i$. Without loss of generality, the component independent operator approach is disclosed and along with related load distribution.

In an aspect, the chart engine 108 can utilize indexlets for parallelization (e.g., distributing computations). The chart engine 108 can determine one or more aggregation functions ($\hat{S}$) and one or more internal functions (e.g., scalar functions) using indexlets. In an example where an aggregation function is to be determined with respect to a single table (e.g., when fields in $\hat{S}$ belong to the same table) is disclosed. For the partition $\{X_i\}$, the disclosed methods can determine a subset $\hat{X} \subset \{X_i\}$ that belongs to an indexlet $Idx_k$. A query can be made with the respective partition in parallel for the set of all indexlets $\{Idx_k\}_k$. Results can be aggregated at a top level when all queries are returned. The primary computational overhead comes from data transmission in this case of all partitions as the query is executed for every indexlet and results returned.

Figure 5K:
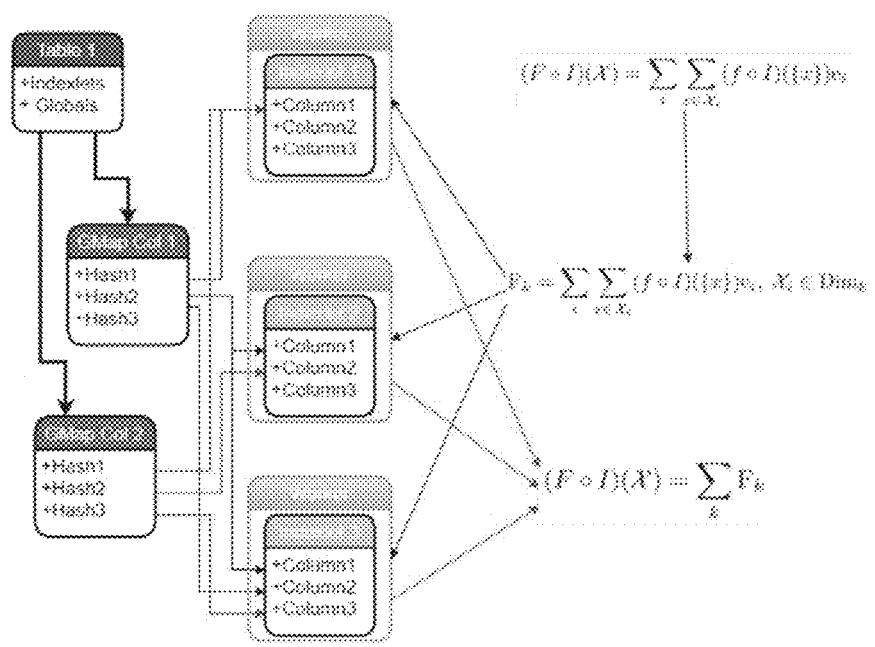
FIG. 5K illustrates load distribution in a single table case.

As shown in FIG. 5K, the chart engine 108 can perform the following example method in the case of $\hat{S}$ being contained within a single table. The chart engine 108 can determine Dim. The chart engine 108 can annotate which indexlets are needed per $Dim^i$. The chart engine 108 can regroup $Dim^i$ per indexlet $Idx_k$. The chart engine 108 assigns to every indexlet a subset $Dim_k \subset Dim$. The chart engine 108 can take $\hat{f}$ as f if the function is summable and domain independent, or its approximation $\tilde{f}$ if not. The chart engine 108 can loop in k: query (in parallel) every indexlet $Idx_k$ with $\hat{f} \circ I$ partitioned by $Dim_k$. For example, by computing:

$$F_k = \sum_i \sum_{x \in \mathcal{X}_i} (f \circ I)(\{x\}) e_i, \mathcal{X}_i \in Dim_k$$

The chart engine 108 can aggregate at top level as a last pass. For example, by computing:

$$(F \circ I)(X) = \sum_k F_k$$

Thus, the chart engine 108 can introduce a clear parallel pattern by every subcomputation on indexlets.

Figure 5L:
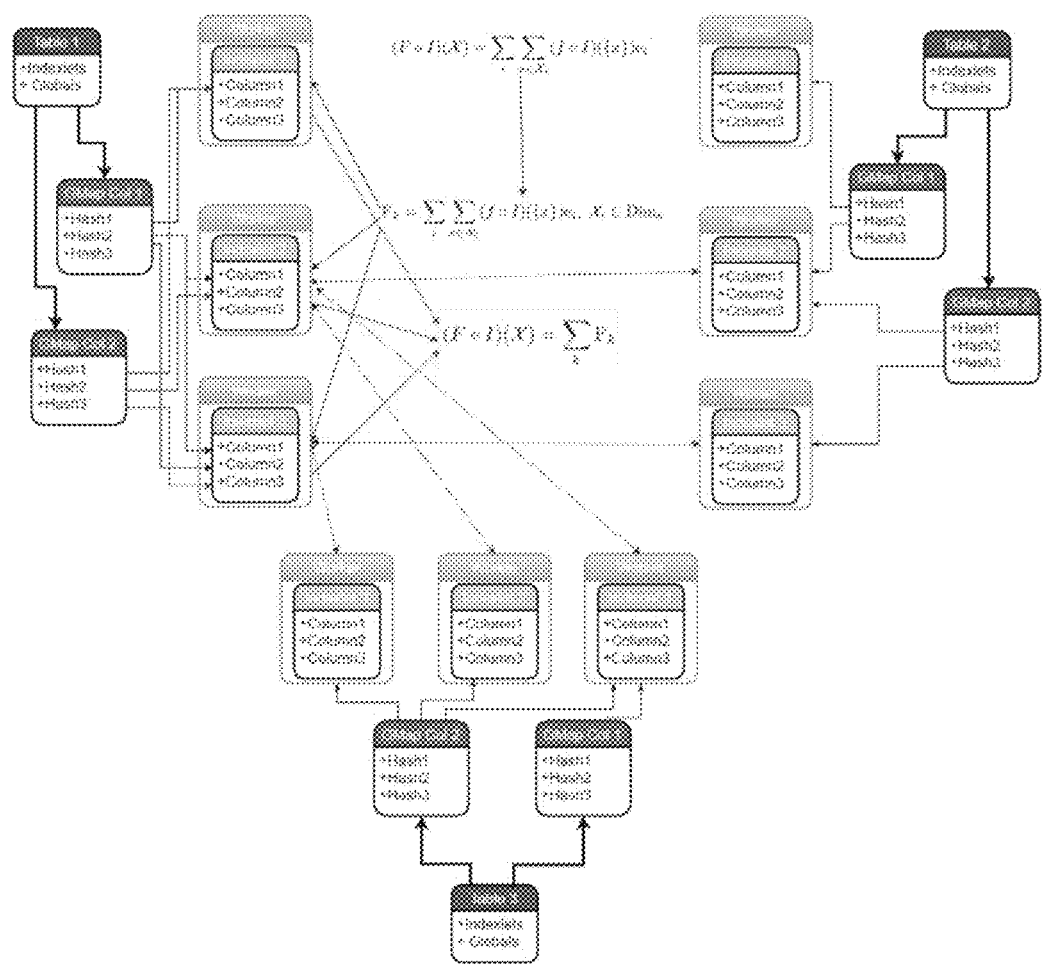
FIG. 5L illustrates load distribution in a multiple table case.

As shown in FIG. 5L, the chart engine 108 can perform the following example method in the case of $\tilde{S}$ being contained within multiple tables. In the multiple table case, the computational overhead is found in constructing virtual records in parallel. The chart engine 108 can determine Dim. The chart engine 108 can annotate which indexlets in all tables are needed per $Dim^{ij}$. The chart engine 108 can regroup $Dim^i$ per indexlet $Idx_k^j$ and table $T_j$. The chart engine 108 thus assigns a subset $Dim_k \subset Dim$ to every indexlet in every table. The chart engine 108 can identify the table with the largest number of indexlets as a distributed master table. The chart engine 108 can pass the expression to compute as tasks to all the indexlets of the master table, and all other tables involved prepare the domain pieces imposed by the partitions $Dim_k^j$. The chart engine 108 can utilize the master table indexlets to query the other indexlets in the closest neighbors indexlets. If the closest neighbors indexlets need further pieces to complete their domains, they ask downstream to their respective dependencies. Every indexlet of the master table then completes the computation of $F_k$. The chart engine 108 can aggregate at top level as a last pass. For example, by computing:

$$(F \circ I)(X) = \sum_k F_k$$

The chart engine 108 thus distributes a hypercube domain across nodes by using the largest table to compute the domain and maximize I/O.

In the event of a data update the underlying data source/data set, a new indexlet can be generated as described above and the new indexlet incorporated into the methods for evaluating an expression (single table or multiple data). A data update can include a modification to existing data and/or appending new data to existing data (e.g., adding data to an existing table or adding a new table of data). Thus, the methods for evaluating an expression shown in FIG. 5K and FIG. 5L enables the system to use the new indexlet (and any existing indexlets as needed) to evaluate an expression, thus avoiding the need to recreate the hypercube/multidimensional cube.

Figure 5M:
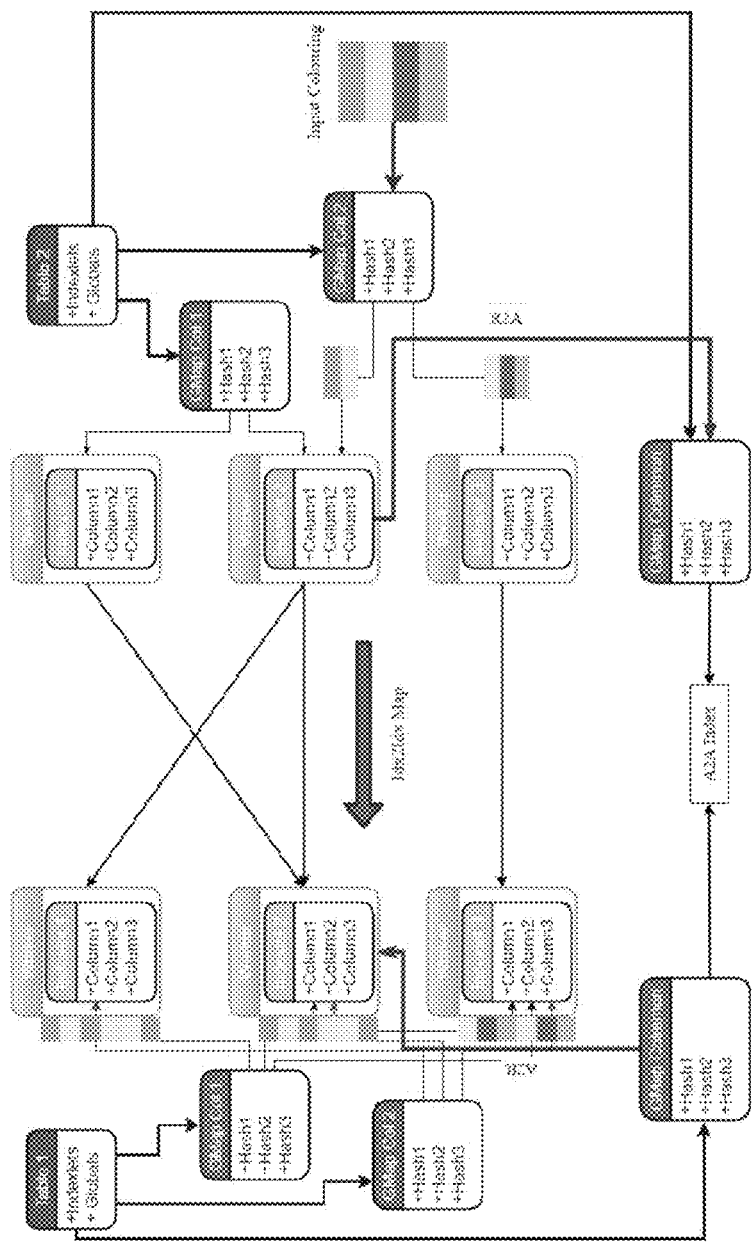
FIG. 5M illustrates I2I mapping.

In an aspect, the chart engine 108 can distribute hypercube domain computation. For example, by finding the partitions of each indexlet per dimensions prescribed. The basic case is given when considering two adjacent tables are associated. The chart engine 108 can utilize an indexlet centric technique instead of a symbol centric technique. The symbol centric traversal is done intra-indexlet. The indexlet centric technique is depicted in FIG. 5M.

The mapping is from indexlet to indexlet in order to establish partitions from symbols to other symbols. This partition can be pre-computed and stored when constructing the A2A map. During the construction of the A2A map, the construction of the I2I map can be performed. The map can be constructed as I2I: N→N where k is associated to j if the indexlet $Idx_a^k$ of table a is associated to indexlet $Idx_b^j$ of table b. Such a coarse mapping can be used then to label the records of indexlet $Idx_a^k$ by the records of $Idx_b^j$ or the symbols of the common dimension of A2A. This can be computed and stored at indexing time for A2A.

Labeling and/or coloring can be distributed per indexlet, collapsing in the resulting indexlets, and then retransmitted to the next table using the I2I map. By way of example, the chart engine 108 can label all active symbols of the dimensions involved and can select the largest table (as measured by number of indexlets) with a column in as a root table. The chart engine 108 can transport the labels using the I2I map to the root table from all tables as shown in FIG. 5M. The result is that the different combinations of labels are then conforming every $Dim_k$. In the case of multiple tables, the chart engine 108 can further propagate the domains to spoke tables, considering the root table as a hub.

Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 114 can comprise, for example, an Application Programming Interface (API). The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprise births there can be timestamps of the births and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc) based on selections/calculations. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Different export features or tools 118 can be used to publish, export or deploy any output of the associative data indexing engine 100. Such output can be any form of visual representation, including, but not limited to, textual, graphical, animation, audio, tactile, and the like.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Figure 3:
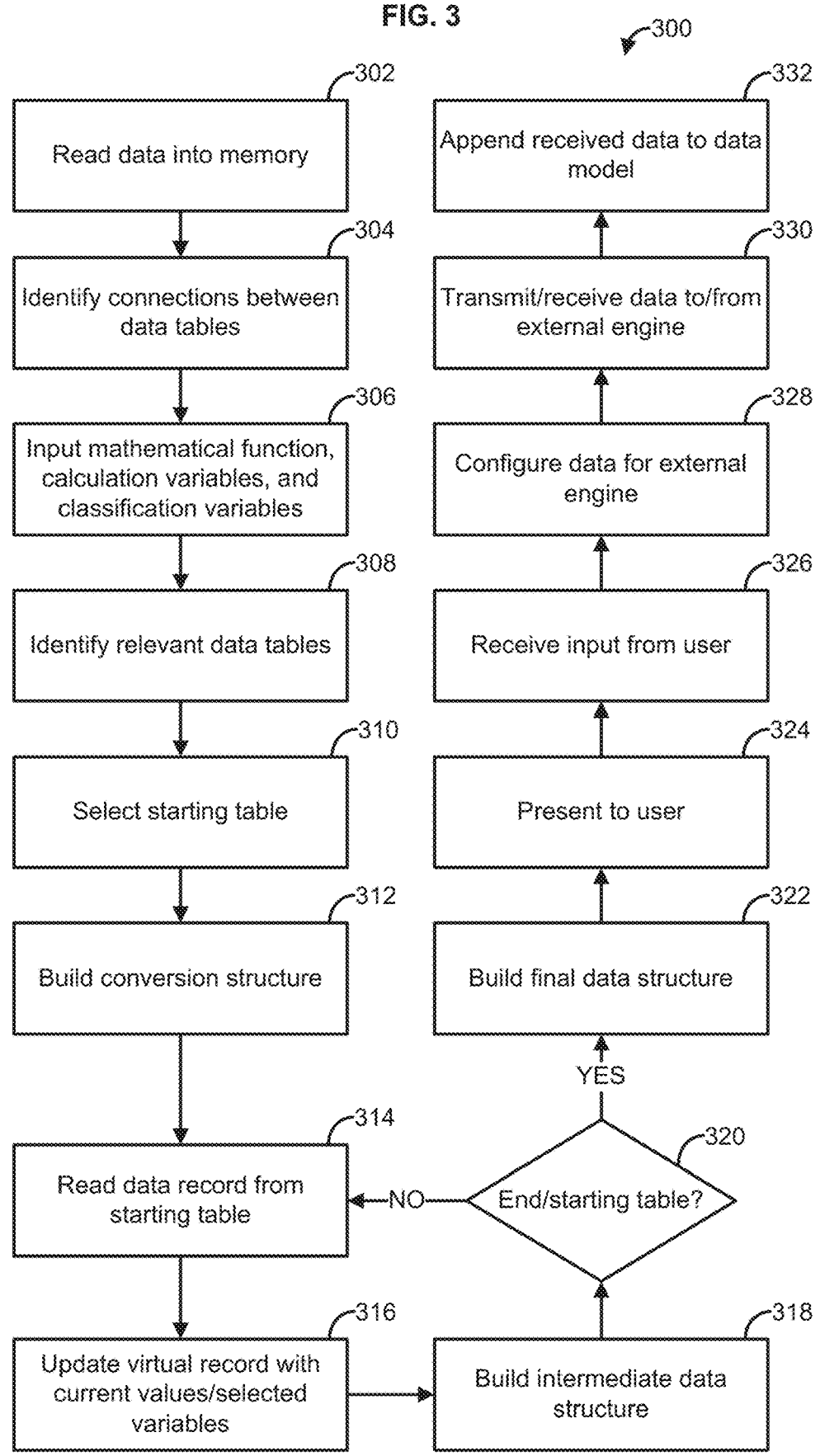
FIG. 3 is a schematic flowchart showing basic steps performed when extracting information from a database.

The methods provided can be implemented by means of a computer program as illustrated in a flowchart of a method 300 in FIG. 3. In a step 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the method 300 can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database. In doing so, the user defines in step 306 a mathematical function, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and Year."

The method 300 then identifies in step 308 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"), These connecting variables link the starting table (Table 2) to the boundary tables (Tables 1 and 3).

Thereafter, a conversion structure can be built in step 312. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999-01-12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In step 318 the virtual data record can be used to build an intermediate data structure Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL, or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube, as shown in non-binary notation in Table 6 of FIG. 4A, can be created in a step 322 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in step 324, as shown in Table 7 of FIG. 4A. Alternatively, if the final data structure contains many dimensions, the data can be presented in a pivot table, in which the user can interactively move up and down in dimensions, as is well known in the art.

In an aspect, step 322 can involve any of the processes described previously with regard to FIG. 5A through FIG. 5M as part of a process for creating the hypercube/multidimensional cube. For example, output from the logical inference engine 18 and/or 106 utilizing one or more BTIs and or one or more A2A. Indexes can be used in creation of the hypercube/multidimensional cube. When a user makes a selection, the inference engine 18 and/or 106 calculates a data subset of which one or more BTIs and/or A2A indexes can be generated and provided to the chart engine 58 and/or 108 for use in generating a hypercube/multidimensional cube and/or evaluating one or more expressions against a hypercube/multidimensional cube via one or more BTIs and/or A2A indexes as described with regard to FIG. 5A through FIG. 5M.

At step 326, input from the user can be received. For example, input form the user can be a selection and/or de-selection of the presented results.

Optionally, input from the user at step 326 can comprise a request for external processing. In an aspect, the user can be presented with an option to select one or more external engines to use for the external processing. Optionally, at step 328, data underlying the user selection can be configured (e.g., formatted) for use by an external engine. Optionally, at step 330, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at step 332, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

FIG. 5A illustrates how a selection 50 operates on a scope 52 of presented data to generate a data subset 54. The data subset 54 can form a state space, which is based on a selection state given by the selection 50. In an aspect, the selection state (or "user state") can be defined by a user clicking on list boxes and graphs in a user interface of an application. An application can be designed to host a number of graphical objects (charts, tables, etc.) that evaluate one or more mathematical functions (also referred to as an "expression") on the data subset 54 for one or more dimensions (classification variables). The result of this evaluation creates a chart result 56 which can be a multidimensional cube which can be visualized in one or more of the graphical objects.

The application can permit a user to explore the scope 52 by making different selections, by clicking on graphical objects to select variables, which causes the chart result 56 to change. At every time instant during the exploration, there exists a current state space, which can be associated with a current selection state that is operated on the scope 52 (which always remains the same).

As illustrated in FIG. 5A, when a user makes a selection, the inference engine 18 calculates a data subset. Also, an identifier ID1 for the selection together with the scope can be generated based on the filters in the selection and the scope. Subsequently, an identifier ID2 for the data subset is generated based on the data subset definition, for example a bit sequence that defines the content of the data subset. ID2 can be put into a cache using ID1 as a lookup identifier. Likewise, the data subset definition can be put in the cache using ID2 as a lookup identifier.

As shown in FIG. 5A, a chart calculation in a calculation/chart engine 58 takes place in a similar way. Here, there are two information sets: the data subset 54 and relevant chart properties 60. The latter can be, but not restricted to, a mathematical function together with calculation variables and classification variables (dimensions). Both of these information sets can be used to calculate the chart result 56, and both of these information sets can be also used to generate identifier ID3 for the input to the chart calculation. ID2 can be generated already in the previous step, and ID3 can be generated as the first step in the chart calculation procedure.

The identifier 1D3 can be formed from ID2 and the relevant chart properties. ID3 can be seen as an identifier for a specific chart generation instance, which can include all information needed to calculate a specific chart result. In addition, a chart result identifier ID4 can be created from the chart result definition, for example a bit sequence that defines the chart result 56. ID4 can be put in the cache using ID3 as a lookup identifier. Likewise, the chart result definition can be put in the cache using ID4 as a lookup identifier.

Optionally, further calculations, transforming, and/or processing can be included through an extension engine 62. Optionally, associated results from the inference engine 18 and further computed by hypercube computation in said calculation/chart engine 58 can be coupled to an external engine 64 that can comprise one or more data processing applications (e.g., simulation applications, statistical applications, mathematical computation applications, database applications, combinations thereof, and the like). Context of a data model processed by the inference engine 18 can comprise a write or tuples of values defined by dimensions and expressions computed by hypercube routines. Data can be exchanged through an interface 66.

The associated results coupled to the external engine 64 can be intermediate. Further results that can be final hypercube results can also be received from the external engine 64. Further results can be fed back to be included in the Data/Scope 52 and enrich the data model. The further results can also be rendered directly to the user in the chart result 56. Data received from and computed by the external engine 64 can be used for further associative discovery.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 6.

The graphical objects or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way.

Optionally, in this application, external processing can also be requested by ticking "External" in the user interface of FIG. 6. Data as shown in FIG. 7 can be exchanged with an External engine 64 through the interface 66 of FIG. 5A. In addition to evaluating the mathematical function ("SUM (Price*Number)") based on the results of the mathematical expression ("Price*Number") contained in the intermediate data structure the mathematical function ("SUM (ExtFunc (Price*Number))") can be evaluated. Data sent out are (Nisse, 1999, Jan, {19.5, null}). In this case the external engine 64 can process data in accordance with the formula if (x==null)
y=0.5
else
y=x as shown in FIG. 7. The result input through the interface 66 will be (19.5, 0.5) as reflected in the graphical presentation in FIG. 6.

In a further aspect, external processing can also be optionally requested by ticking "External" in a box as shown in FIG. 8. Data as shown in FIG. 9 can be exchanged with an external engine 64 through the Interface 66 of FIG. 5A. In addition to evaluating the mathematical function ("SUM (Price*Number)") based on the results of the mathematical expression ("Price*Number") contained in the intermediate data structure the mathematical function SUM (ExtFunc(Price*Number))

can be evaluated. Data sent out are (Nisse, 1999, Jan, {19.5, null}). In this case the external engine 64 will process data in accordance with Function (1) as shown below and in FIG. 9. The result input through the Interface 66 will be (61.5) as reflected in the graphical presentation in FIG. 8.

y=ExtAggr(x[ ])
for (x in x[ ])
  if (x==null)
    y=y+42
  else
    y=y+x
Function (1)

Figure 13:
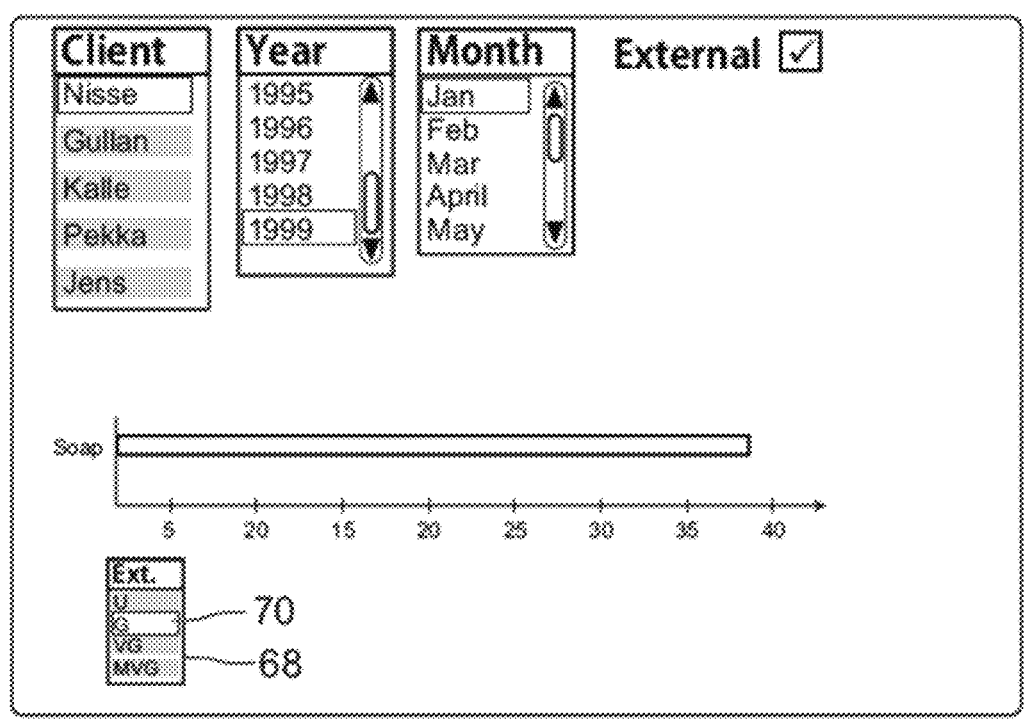
FIG. 13 is a schematic graphical presentation showing a further set of selections and a diagram of data associated to the selections as received after third computations from an external engine.

A further optional embodiment is shown in FIG. 10 and FIG. 11. The same basic data as in previous examples apply. A user selects "Pekka," "1999," "Jan," and "External." By selecting "External," already determined and associated results are coupled to the external engine 64. Feedback data from the external engine 64 based on an external computation, ExtQualification(Sum(Price*Number)), as shown in FIG. 13 will be the information "MVG" This information can be fed back to the logical inference engine 18. The information can also be fed back to the graphical objects of FIG. 10 and as a result a qualification table 68 will highlight "MVG" (illustrated with a frame in FIG. 10). Other values (U, G, and VG) are shown in gray areas. The result input through the Interface 66 will be Soap with a value of 75 as reflected in the graphical presentation (bar chart) of FIG. 10. FIG. 11 is a schematic representation of data exchanged with an external engine based on selections in FIG. 10. FIG. 12 is a table showing results from computations based on different selections in the presentation of FIG. 10.

Should a user instead select "Gullan," "1999," "Jan," and "External," the feedback signal would include "VG" based on the content shown in qualification table 68. The computations actually performed in the external engine 62 are not shown or indicated, since they are not relevant to the inference engine.

In FIG. 13 a user has selected "G" as depicted by 70 in the qualification table 68. As a result information fed back from the external engine 64 to the external engine 62 and further to the inference engine 18 the following information will be highlighted: "Nisse," "1999," and "Jan" as shown in FIG. 13. Furthermore, the result produced will be Soap 37.5 as reflected in the graphical presentation (bar chart) of FIG. 13.

A result of the various methods and systems disclosed herein is a business analytic solution. The business analytic solution operates on the data stored and/or generated (e.g., hypercube/multidimensional cube, various indexes, etc . . . ) by the disclosed methods and systems. Users of the business analytic solution can query the data to obtain insight into the data. The query can be made, for example, by specifying data element types and data element values of interest and by further specifying any functions to apply to the data contained within the specified data element types of the database. The functions which can be used within a query can include, for example, expressions using statistics, sub-queries, filters, mathematical formulas, and the like, to help a user to locate and/or calculate the specific information wanted from the database. Once located and/or calculated, the results of a query can be displayed to the user with various visualization techniques and objects such as list boxes or various charts of a user interface. In another aspect, a result of the query can be displayed not only as visualizations but in the form of natural language, providing the user an insight overview across data sources and/or data tables.

Provided herein is a "smart" business analytic solution. For example, the business analytic solution can make reasonable defaults at various steps of an analysis, from data preparation, to building the data model, and preparing visual and/or text analyses. In an aspect, the business analytic solution can guide users to make sensible choices in order to quickly get to both expected answers and new answers (e.g., new insights). The business analytic solution enables a user to find unknown insights from the data and presents it to the user with the use of the precedent-based system disclosed.

Domain experts, such as data architects, or visualization experts, are sources to provide rules (e.g., defaults and guidelines, usually in the form of generic best practices) for data analysis. Similarly, specific precedents that are established by users or a community of users who actually use the data are also sources of rules (e.g., defaults and guidelines) for data analysis. The disclosed methods and systems present an optimized technique to capture and represent such rules. Given the heuristic nature of such rules, the disclosed methods and systems can utilize precedents to capture both types of rules (e.g., domain expert rules and user rules). Such precedents can then be utilized in a system that, given a specific context, can locate applicable precedents (for example, by similarity and/or generalization) and use those precedents to enable smart data analysis behavior.

Figure 15:
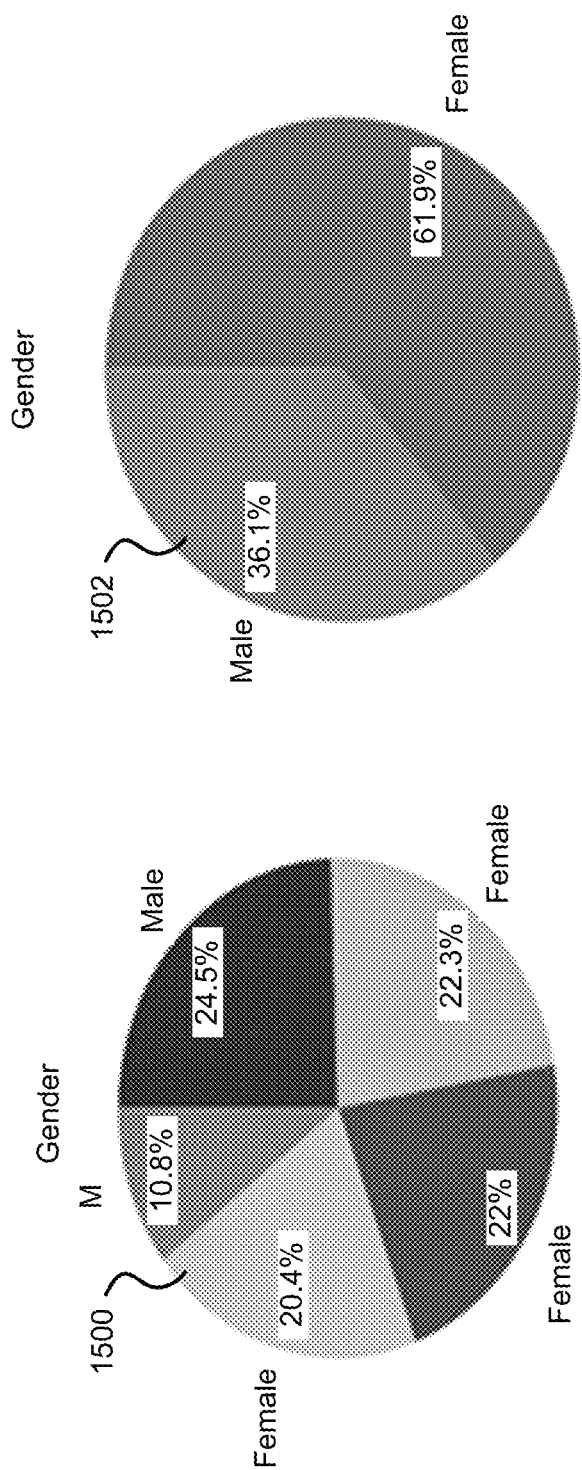
FIG. 15 illustrates example data visualizations.

A successful data analysis involves many steps and few iterations. A seasoned user draws on his/her experience to shorten the experience. One technique to make this experience pleasantly accessible, or idealistically less painful, for a less experience user is to leverage the collective wisdom of domain experts at various step if the way. Consider the dataset of FIG. 14. Assume an inexperienced user wants to perform a basic analysis, such as a breakdown of employees by Gender, which results in a pie chart 1500 of FIG. 15. Clearly the data is not clean and some values buried among thousands of rows need to be normalized. After a clean-up of the data (or writing a necessary script to clean-up the data), a reload of the data results in a pie chart 1502, which may still appear suspect (e.g., assume the user knows for fact that the number of female employees is not greater than the number of male employees). After further examination, it could be determined that even the pie chart 1502 is incorrect because (while appearing valid for lack of extraneous values) the underlying data included Employee numbers that were averaged and not counted.

As a further example, consider an analysis of employees by age and monthly pay. FIG. 16 shows a chart 1600 that is not very useful. For example, age brackets would ideally be a lot more useful than individual ages, which again requires either leaving the business analytic solution to create an age bucket field, or writing a script, and reloading the data. Another factor in making the chart 1600 less effective is the fact that pay and age values are at different scale levels. Next, consider a chart 1602 illustrating the break-down of employees based on their performance ratings. Again, it is less than ideal as the ratings are ordered alphabetically and not based on their intended values, which inevitably requires fixing in the script, and reloading. Finally, for an analysis of gender by department, user is likely to produce a following treemap 1700 shown in FIG. 17. A more experienced user, however, would have used the dimensions in a different order (on the basis of their cardinality) and produce a chart 1702.

The disclosed business analytic solution can be configured to advise the user at one or more steps of the data analysis process, guiding the user based on a set of rules, for example:

1. Gender values are usually normalized
2. Age values could be bucketed using well-known age range.
3. Use of a piechart make sense only for measure whose values can be added up to 100% for values of a given dimension (e.g., number of employees by gender makes sense, but population for countries would not make sense if the data contain population for previous years as well)
4. Measures in a bar chart are best to be proportionate.
5. Count (Or count distinct when values are repeated) is the most sensible way of aggregating a dimension field.
6. Dimensions in a treemap are best arranged in an descending order of their cardinality
7. Order of performance ratings is Poor<Satisfactory<Average<Exceeds Expectation<Star.

It is important to note that all those rules, perhaps with the exception of rule 7, are not specific to any particular dataset or application. Some of the rules (3, 4, 5 and 6) are common, best practices. And the rules concerning data preparation (rules 1-2) are common enough that could be learned and applied across datasets and there are other examples). Even rule 7 can be learned and applied safely across different applications within a domain.

The disclosed methods and systems can utilize a notion of precedent that can be leveraged at different levels of abstraction. For example, a complex market-basket analysis prepared in a specific context could be reused in another context, perhaps with a different set of tables and fields as long as the similarity of the two contexts is established. Similarly, an existing data model could be leveraged in building a new data model as long as key factors (tables and key fields) are reasonably similar between the two models.

In an aspect, the methods and systems can utilize precedents as a component of a recommendation system. The methods and systems consider a number of factors when determining how best to represent types of rules. For example, rules can be heuristic in nature, as such it is possible to have more than one applicable rule (e.g., with varying degrees of applicability) for a single input. Formulation of rules can be simple or complex. Rules can be generalized, both when finding applicable rules as well as when collecting rules.

In an aspect, the methods and systems can leverage an example-based precedent meets all those criteria. A precedent represents a good (recommended) or typical use of a particular topic. It can also represent a pitfall, something to avoid. Precedents can be organized in general topics. By way of example, a precedent can comprise one or more of the following elements:

| | |
|---|---|
| Class | An organizing topic |
| Type | Avoid or Promote |
| Match Criteria | A feature set which is used to determine applicability of a precedent |
| Scope | The context or source of the precedent (such as dataset) that is also used in determining applicability |
| Content | The specific recommendation or outcome of the precedent |
| Strength | The confidence or credibility of the rule |

A precedent can represent reusable, heuristic rules. A precedent can be used not just for capturing simple or complex rules.

Figure 18:
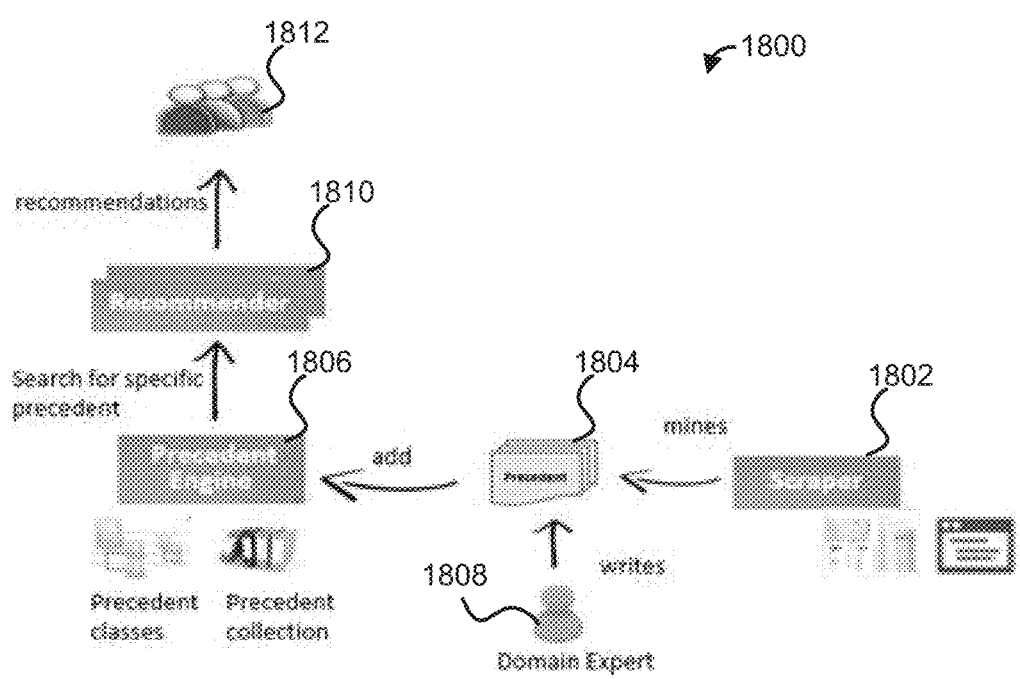
FIG. 18 illustrates an example precedent system.

FIG. 18 provides a view of components in a precedent-based system 1800. The system 1800 can comprise one or more specialized scrapers 1802 that can be responsible for extracting and collecting precedents 1804 from various analytic assets such as scripts or visualizations. What to collect can be governed by a "type" system, with one or more precedent classes maintained by a precedent engine 1806. The scrapers 1802 can detect the key characteristics and other information. The precedents 1804 can also be added by one or more domain experts 1808. The scrapers 1802 and/or the precedent engine 1804 can also monitor a user's interaction with data over time. The scrapers 1802 and/or the precedent engine 1804 can capture user interactions and store certain interactions as precedents. The scrapers 1802 and/or the precedent engine 1804 can capture user interactions (including precedents used by the user) and suggest additional more relevant insights to the user.

In an aspect, a precedent can be derived from the underlying associative data model described herein. A portion of precedents can be derived from hard-coded rules and fixed sets of ontologies given by the scraper/precedence engine. Then to search for related terms indicative of a precedent that could be relevant, the disclosed methods and systems can rely on associative relationships to determine one or more relevant precedents.

The precedent engine 1804 can store precedents 1804 and can apply generalization and conflict resolutions. The precedent engine 1804 can enable search capabilities so that recommenders 1810 can retrieve applicable precedents 1804 for a given topic.

The precedent engine 1804 can maintain a set of specifications about topics for which precedents 1804 are collected and can be queried. The exact make-up of each topic, from characteristic used for matching to content can be determined by collaboration between the contributing scraper/expert and consuming recommender. The precedent engine 1804 can maintain a strength/credibility indicator for each precedent to assess the usefulness of the recommendations and/or precedents 1804.

Recommenders 1810 can be responsible for providing "smart" experience. Techniques for providing the "smart" experience can vary by scenario. For example, applicable data preparation could be recommended to a user 1812 and, when confirmed, incorporated into a generated load script for the user 1812. The disclosed methods and systems also get "smarter" over time as it captures user interactions with the data, as well as suggested insights, analyzes them, and use such analysis to make more relevant and smarter suggestions to the user The disclosed methods and systems can be configured to find the optimal precedents to use. For example, the disclosed methods and systems can consider one or more factors such as:

Only the most essential characteristic must be specified as matching criteria for a precedent. For example, a data normalization precedent can be keyed only on the affected values, and not field name for instance. This can be done both by the collectors/domain experts, and achieved through a generalization process as precedents are added (more in next section).

The engine must be capable of providing basic similarity match.

The precedent engine 1804 can provide field-level and dataset-level similarity functionality. For example, a precedent 1804 specified for a numerical field name Revenue (such as formatting) could be considered relevant (with decreasing degree) with similar fields with names such as DEP_REVENUE, Last Year Revenue, Total Revenue, Net Revenue . . . (head-noun match)

Income, Total Earnings, Net Income . . . (synonym)

Cost, Expenditure . . . (related)

Similarly, two datasets could be considered similar as long as they share certain key characteristics (e.g., keyed on similar fields, similar fields but possibly in different order etc.).

As the number of precedents grows the method and systems can keep the volume to a manageable size by, for example:

Discarding unused precedents.

Discarding conflicting precedents. Conflicts are a sign of error, or lack of reliable precedent.

Maintain generalized precedents. For example, if Employee Number is always SUM-ed in various contexts, once enough evidence is encountered, the individual precedent could be rolled into an overarching precedent.

The sample precedents presented in this section are divided into two groups, those that represent best practices and common sense guidelines provided by domain experts, and those that can be scraped from analytic artifacts. The precedents presented in this section are merely examples and hence their actual contents are of secondary concern.

Figure 19:
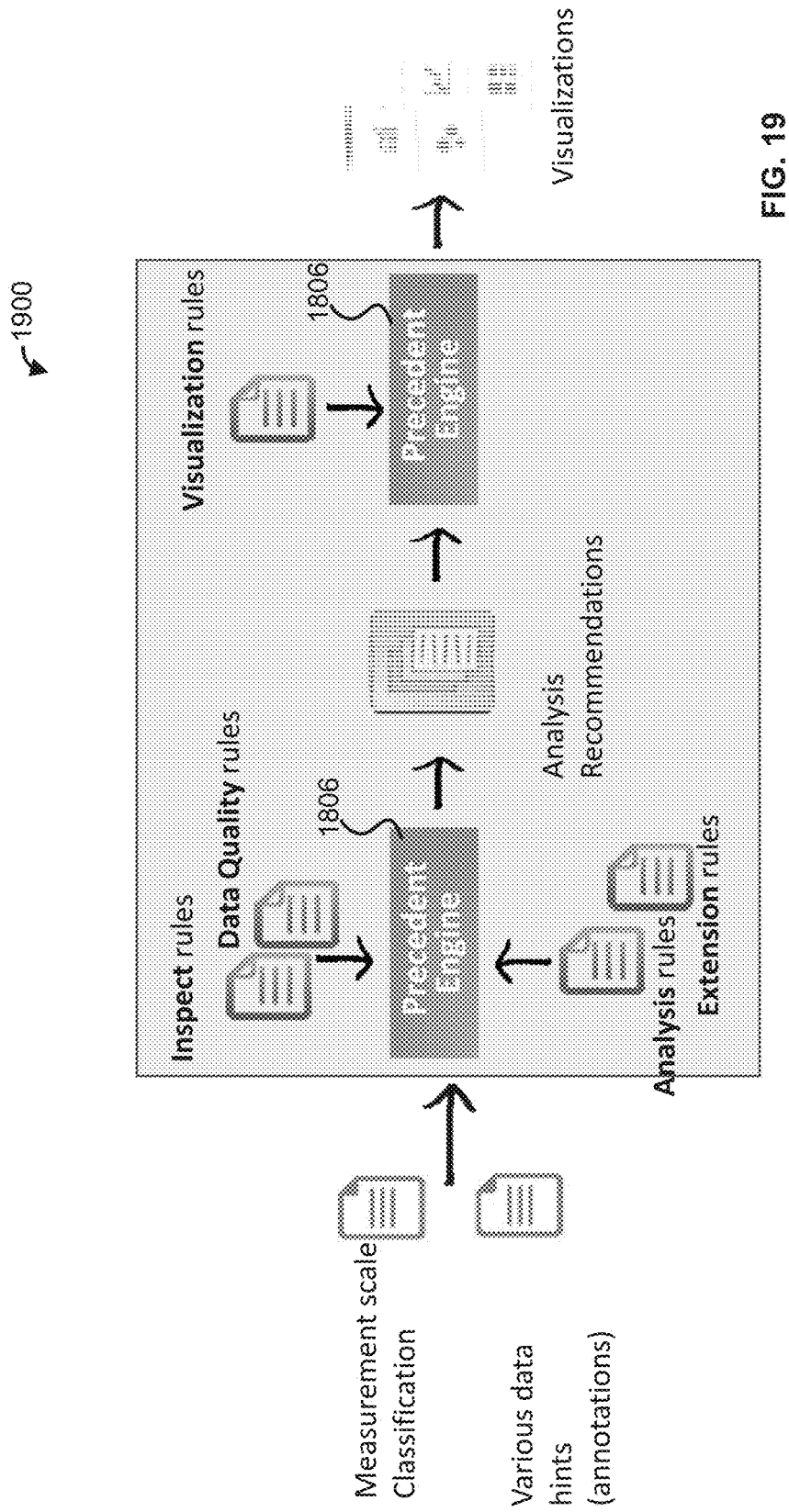
FIG. 19 illustrates an example precedent system.

In an aspect, illustrated in FIG. 19, an precedent-based system 1900 is provided. The precedent engine 1806 can draw on a measurement of scale classification of data fields, and various data hints such as cardinality and distribution and values ranges, to ultimately make visualization recommendations. FIG. 19 further illustrates how the precedent engine 1806 can utilizes the notion of 'precedent' for different purposes, for example, to raise data quality issues, or provide hints about the data (such as distribution of data), or recommending analyses and rules to visually communicate each set of findings as charts. In an aspect, the precedent-based system 1900 can generate not just visualizations, but also natural language descriptions of data and/or data analysis. The rules are also all extendible, meaning they can be used by domain expert for specific effects or 'learned' as new precedents are set as the users provide feedback on the recommendations (for example, by liking or disliking).

In an aspect, a scoring system can be provided whereby one or more users can indicate a score (e.g., 1-5) or a like/dislike for a precedent. The scores can be aggregated over time and be used to determine whether to recommend a precedent or to potentially discontinue recommending a precedent. In a further aspect, the scoring system can be automatic. For example, the scoring system can track a number of times a precedent is used and use such information to increase a relative score of a precedent that is used often in relationship to a precedent that is used less often.

Provided herein are examples of guidelines represented as precedents. Note that in most cases, such recommendations are not scoped to any particular dataset or applications.

Visualization Guidelines:

| Class | BarChart Appearance |
|---|---|
| Description | Values of the measures in a bar chart better to be proportionate |
| Type | Avoid |
| Match Criteria | chartType: BarChart, appearance: Grouped, COMPARABLE_SCALE(measure$_1$, measure$_2$) |
| Scope | — |
| Content | Appearance = Stacked, Strength = 0.8 |
| Class | Chart Type |
| Description | Bar chart is recommended for dimension with small number of values and few measures |
| Type | Promote |
| Match Criteria | DISTINCT_COUNT(dimension) <= 10, NUM_MEASURES <4 |
| Scope | — |
| Content | ChartType = BarChart, Strength = 1.0 |
| Class | LineChart Measures |
| Description | Use of Derived measures (where one is calculated based on the other) in a line chart is not useful |
| Type | Avoid |
| Match Criteria | chartType: LineChart, DERIVED(measure$_1$, measure$_2$) |
| Scope | — |
| Content | Strength = 0.7 |

| Class | ChartSorting |
|---|---|
| Description | Numeric-sort must be default sort option for temporal dimensions, in any applicable chart |
| Type | Promote |
| Match Criteria | CLASSIFICATION(dimension) == 'temporal' |
| Scope | — |
| Content | SortingOption = Ascending NumericSort, Strength = 1.0 |

Examples of possible precedents that could be collected by mining existing applications in order to leverage them in 'similar situations' or generalized across applications.

Data Preparation:

| Class | OrdinalDimension |
|---|---|
| Description | Detect dimension with members with defined order Look for 'mapping load', 'dual' and 'apply map' constructs |
| Type | Promote |
| Match Criteria | Set of values |
| Scope | Table (dataset), field |
| Content | Ordered set of <value, num> pairs |

| Class | MeasureBucketing |
|---|---|
| Description | Detect specific measure value ranges Look for 'class', nested-ifs with 'dual' constructs in script As well as 'histogram' charts |
| Type | Promote |
| Match Criteria | VALUE_RANGE(field), Field name |
| Scope | Table (dataset) |
| Content | Ordered set of ranges [lower, upper] and their captions |

| Class | ValueNormalization |
|---|---|
| Description | Normalizing variations of a value to a canonical form Look for 'if-match', or 'mapping load' constructs in script |
| Type | Promote |
| Match Criteria | Set of values |
| Scope | Table (dataset), field |
| Content | Series of <variations set, canonical value> pairs |

Analytic artifacts, such as visualizations and stories, contain information about the proper use of data fields individually and in association with others. Some examples include:

| Class | DefaultAggregate |
|---|---|
| Description | Establish the default aggregate function, optionally when used in combination of another field |
| Type | Promote |
| Match Criteria | Field name (measure), [field name (dimension)] |
| Scope | Table (dataset), |
| Content | One of MIN/MAX/COUNT/SUM or an expression |

| Class | MeasureScope |
|---|---|
| Description | What dimension is in scope for a given measure, specially in case of temporal dimensions (order-date or ship-date for revenue) |
| Type | Promote |
| Match Criteria | Field name (measure), field name (dimension) |
| Scope | Table (dataset), |
| Content | Optionally Aggregate function |

Figure 20:
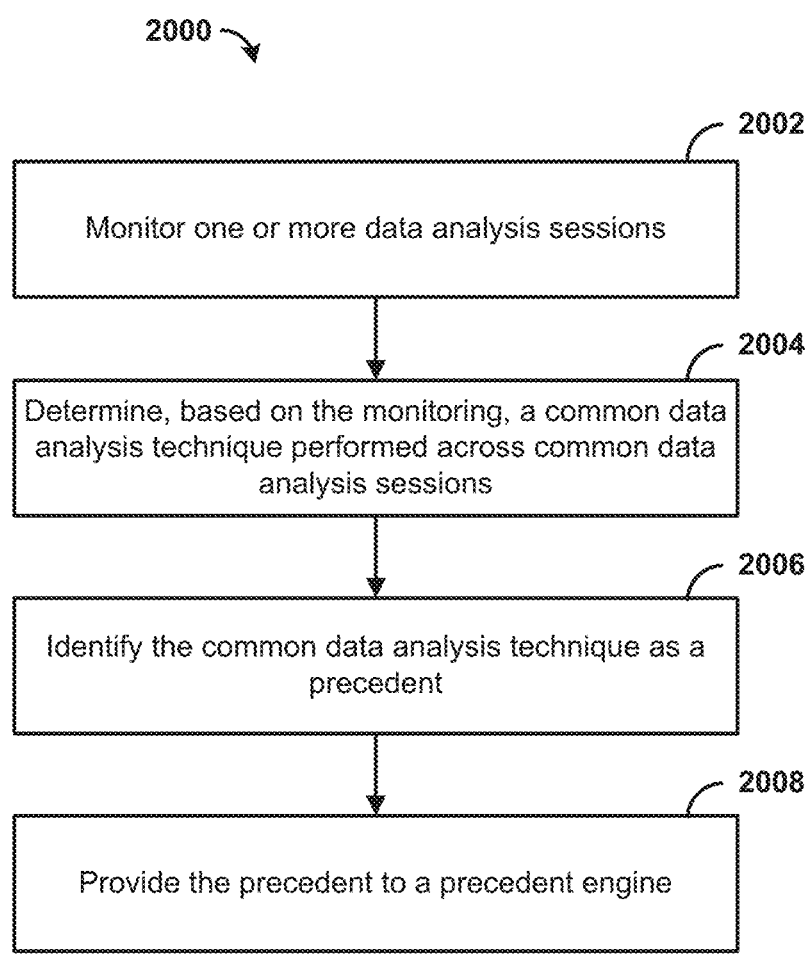
FIG. 20 is a flow chart illustrating an example method.

In an aspect, illustrated in FIG. 20 provided is a method 2000 comprising monitoring one or more data analysis sessions at 2002. The method 2000 can comprise determining, based on the monitoring, a common data analysis technique performed across common data analysis sessions at 2004. The method 2000 can comprise identifying the common data analysis technique as a precedent at 2006. The method 2000 can comprise providing the precedent to a precedent engine at 2008.

The monitoring one or more data analysis sessions can be performed by one or more scrapers. The common data analysis technique can comprise one or more of, an expression, a visualization, or an aggregation. Determining, based on the monitoring, a common data analysis technique performed across common data analysis sessions can comprise determining common data analysis sessions. Determining common data analysis sessions can comprise determining a common feature among the one or more data analysis sessions. The common feature can comprise one or more of, a common user, a common data set, a common data type, a common visualization, or a common title. Identifying the common data analysis technique as a precedent can comprise storing one or more parameters of the precedent as a rule to be applied to a future data analysis session.

Figure 21:
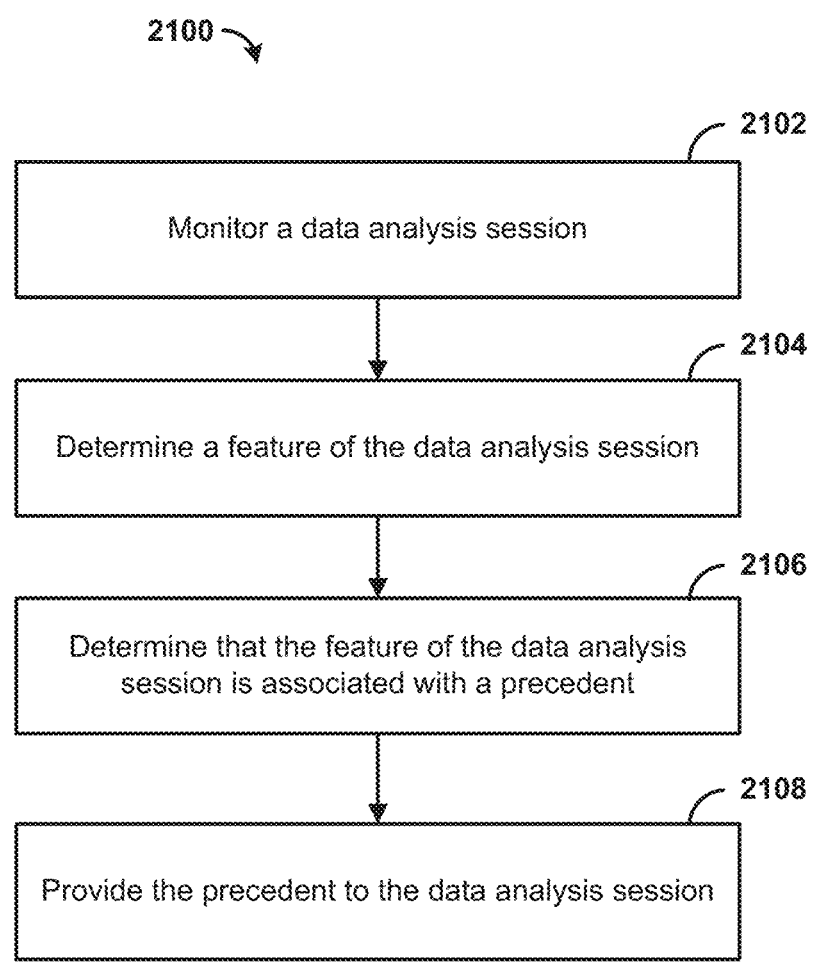
FIG. 21 is a flow chart illustrating another example method.

In an aspect, illustrated in FIG. 21 provided is a method 2100 comprising monitoring a data analysis session at 2102. The method 2100 can comprise determining a feature of the data analysis session, determining that the feature of the data analysis session is associated with a precedent at 2104. The method 2100 can comprise providing the precedent to the data analysis session at 2106.

The feature can comprise one or more of, a user, a data set, a data type, a visualization, or a title. The precedent can comprise a data analysis technique. The data analysis technique can comprise one or more of, an expression, a visualization, or an aggregation. Determining that the feature of the data analysis session is associated with a precedent can comprise query a database of precedents to determine one or more precedents with the feature. Providing the precedent to the data analysis session can comprise generating a recommendation to a user of the data analysis session. Generating the recommendation to the user of the data analysis session can comprise displaying a visual indication to the user that the precedent is available to be applied to the data analysis session.

Figure 22:
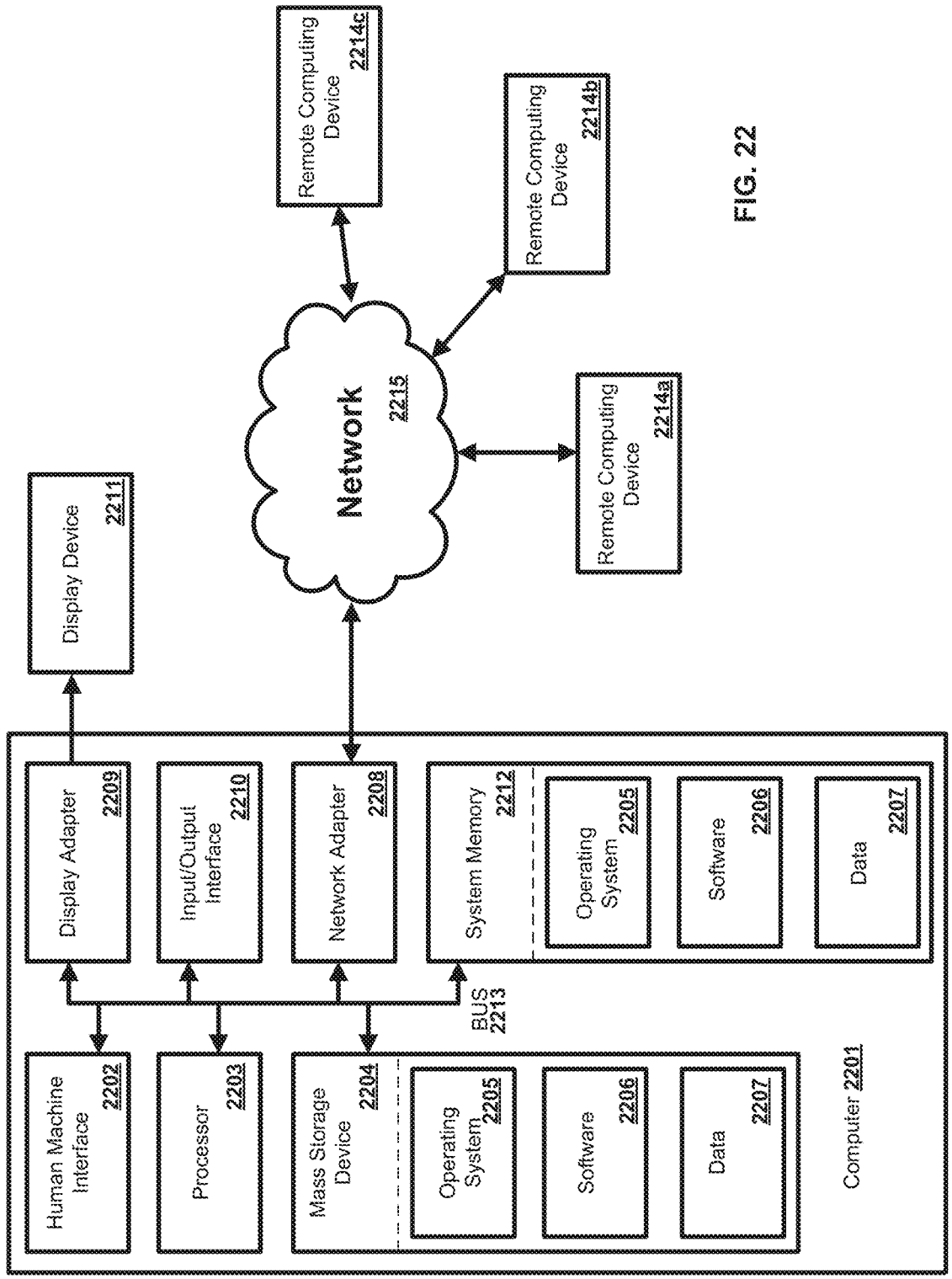
FIG. 22 is an exemplary operating environment for performing the disclosed methods.

In an exemplary aspect, the methods and systems can be implemented on a computer 2201 as illustrated in FIG. 22 and described below. Similarly, the methods and systems disclosed can utilize one or more computers to perform one or more functions in one or more locations. FIG. 22 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2201. The components of the computer 2201 can comprise, but are not limited to, one or more processors 2203, a system memory 2212, and a system bus 2213 that couples various system components including the one or more processors 2203 to the system memory 2212. The system can utilize parallel computing.

The system bus 2213 represents one or more of several possible types of bus structures, including a memory bus or memory controller, a peripheral bus, an accelerated graphics port, or local bus using any of a variety of bus architectures. The bus 2213, and all buses specified in this description can also be implemented over a wired or wireless network connection and each of the subsystems, including the one or more processors 2203, a mass storage device 2204, an operating system 2205, software 2206, data 2207, a network adapter 2208, the system memory 2212, an Input/Output Interface 2210, a display adapter 2209, a display device 2211, and a human machine interface 2202, can be contained within one or more remote computing devices 2214a,b,c at physically separate locations, connected through buses of this form, in effect implementing a fully distributed system.

The computer 2201 typically comprises a variety of computer readable media. Exemplary readable media can be any available media that is accessible by the computer 2201 and comprises, for example and not meant to be limiting, both volatile and non-volatile media, removable and non-removable media. The system memory 2212 comprises computer readable media in the form of volatile memory, such as random access memory (RAM), and/or non-volatile memory, such as read only memory (ROM). The system memory 2212 typically contains data such as the data 2207 and/or program modules such as the operating system 2205 and the software 2206 that are immediately accessible to and/or are presently operated on by the one or more processors 2203.

In another aspect, the computer 2201 can also comprise other removable/non-removable, volatile/non-volatile computer storage media. By way of example, FIG. 22 illustrates the mass storage device 2204 which can provide non-volatile storage of computer code, computer readable instructions, data structures, program modules, and other data for the computer 2201. For example and not meant to be limiting, the mass storage device 2204 can be a hard disk, a removable magnetic disk, a removable optical disk, magnetic cassettes or other magnetic storage devices, flash memory cards, CD-ROM, digital versatile disks (DVD)) or other optical storage, random access memories (RAM), read only memories (ROM), electrically erasable programmable read-only memory (EEPROM), and the like.

Optionally, any number of program modules can be stored on the mass storage device 2204, including by way of example, the operating system 2205 and the software 2206. Each of the operating system 2205 and the software 2206 (or some combination thereof) can comprise elements of the programming and the software 2206. The data 2207 can also be stored on the mass storage device 2204. The data 2207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In an aspect, the software 2206 can comprise one or more of a script engine, a logical inference engine, a calculation engine, an extension engine, and/or a rendering engine. In an aspect, the software 2206 can comprise an external engine and/or an interface to the external engine.

In another aspect, the user can enter commands and information into the computer 2201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 2203 via the human machine interface 2202 that is coupled to the system bus 2213, but can be connected by other interface and bus structures, such as a parallel port, game port, an IEEE 1394 Port (also known as a Firewire port), a serial port, or a universal serial bus (USB).

In yet another aspect, the display device 2211 can also be connected to the system bus 2213 via an interface, such as the display adapter 2209. It is contemplated that the computer 2201 can have more than one display adapter 2209 and the computer 2201 can have more than one display device 2211. For example, the display device 2211 can be a monitor, an LCD (Liquid Crystal Display), or a projector. In addition to the display device 2211, other output peripheral devices can comprise components such as speakers (not shown) and a printer (not shown) which can be connected to the computer 2201 via the Input/Output Interface 2210. Any step and/or result of the methods can be output in any form to an output device. Such output can be any form of visual representation, including, but not limited to, textual, graphical, animation, audio, tactile, and the like. The display device 2211 and computer 2201 can be part of one device, or separate devices.

The computer 2201 can operate in a networked environment using logical connections to one or more remote computing devices 2214*a,b,c*. By way of example, a remote computing device can be a personal computer, portable computer, smartphone, a server, a router, a network computer, a peer device or other common network node, and so on. Logical connections between the computer 2201 and a remote computing device 2214*a,b,c* can be made via a network 2215, such as a local area network (LAN) and/or a general wide area network (WAN). Such network connections can be through the network adapter 2208. The network adapter 2208 can be implemented in both wired and wireless environments. In an aspect, one or more of the remote computing devices 2214*a,b,c* can comprise an external engine and/or an interface to the external engine.

For purposes of illustration, application programs and other executable program components such as the operating system 2205 are illustrated herein as discrete blocks, although it is recognized that such programs and components reside at various times in different storage components of the computing device 2201, and are executed by the one or more processors 2203 of the computer. An implementation of the software 2206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
    monitoring, by a computing device, one or more data analysis sessions associated with a dataset comprising a plurality of data records, wherein the one or more data analysis sessions comprise one or more user selections of one or more graphical objects of a plurality of graphical objects via one or more user interfaces, and wherein the one or more user selections of the one or more graphical objects cause a selection of one or more data records of the plurality of data records;
    determining, based on the monitored one or more data analysis sessions, a common data analysis technique performed across the one or more data analysis sessions, wherein the common data analysis technique comprises a result of an evaluation of the one or more data records that are selected based on the one or more user selections of the one or more graphical objects via the one or more user interfaces;
    identifying the common data analysis technique as a precedent;
    determining one or more dimensions associated with the one or more data records;
    providing the precedent to a precedent engine, wherein the precedent comprises one or more parameters based on the one or more dimensions;
    monitoring a further data analysis session comprising one or more further user selections of the plurality of graphical objects via the one or more user interfaces, wherein the one or more further user selections cause a selection of a portion of the plurality of data records associated with the one or more dimensions and indicative of the one or more parameters;
    providing, based on the one or more further user selections, at least one further graphical object, via the one or more user interfaces, during the further data analysis session, wherein the at least one further graphical object comprises an indication that the precedent is available to be applied to the further data analysis session,
    receiving, via the one or more user interfaces during the further data analysis session, a selection of the at least one further graphical object; and
    applying, by the precedent engine, based on the selection of the at least one further graphical object, the precedent to the further data analysis session, wherein applying the precedent comprises performing the common data analysis technique based on the portion of the plurality of data records.

2. The method of claim 1, wherein the one or more dimensions comprise one or more classification variables within the plurality of data records.

3. The method of claim 1, wherein the common data analysis technique comprises one or more of an expression, a visualization, or an aggregation.

4. The method of claim 1, wherein determining the common data analysis technique performed across the one or more data analysis sessions comprises determining a common feature associated with the one or more data analysis sessions, wherein the common feature comprises one or more of a common user, a common data set, a common data type, a common visualization, or a common title.

5. The method of claim 1, wherein the further data analysis session comprises a visualization of the dataset based on the one or more further user selections, and wherein applying the precedent to the further data analysis session comprises applying the precedent to the visualization of the dataset.

6. The method of claim 1, further comprising:
determining, based on at least one of: a user-provided score associated with the precedent or a quantity of uses of the precedent across other data analysis sessions, a score for the precedent; and
determining, based on the score for the precedent, that the precedent is to be recommended or not recommended.

7. The method of claim 1, wherein the one or more parameters comprise at least one of: a class, a match criteria, a scope, or a content type.

8. An apparatus comprising:
one or more processors, and
a memory storing processor executable instructions that, when executed by the one or more processors, cause the apparatus to:
monitor one or more data analysis sessions associated with a dataset comprising a plurality of data records, wherein the one or more data analysis sessions comprise one or more user selections of one or more graphical objects of a plurality of graphical objects via one or more user interfaces, and wherein the one or more user selections of the one or more graphical objects cause a selection of one or more data records of the plurality of data records;
determine, based on the monitored one or more data analysis sessions, a common data analysis technique performed across the one or more data analysis sessions, wherein the common data analysis technique comprises a result of an evaluation of the one or more data records that are selected based on the one or more user selections of the one or more graphical objects via the one or more user interfaces;
identify the common data analysis technique as a precedent;
determining one or more dimensions associated with the one or more data records;
provide the precedent to a precedent engine, wherein the precedent comprises one or more parameters based on the one or more dimensions;
monitor a further data analysis session comprising one or more further user selections of the plurality of graphical objects via the one or more user interfaces, wherein the one or more further user selections cause a selection of a portion of the plurality of data records associated with the one or more dimensions and indicative of the one or more parameters;
provide, based on the one or more further user selections, at least one further graphical object, via the one or more user interfaces, during the further data analysis session, wherein the at least one further graphical object comprises an indication that the precedent is available to be applied to the further data analysis session,
receive, via the one or more user interfaces during the further data analysis session, a selection of the at least one further graphical object; and
apply, by the precedent engine, based on the selection of the at least one further graphical object, the precedent to the further data analysis session, wherein applying the precedent comprises performing the common data analysis technique based on the portion of the plurality of data records.

9. The apparatus of claim 8, wherein the one or more dimensions comprise one or more classification variables within the plurality of data records.

10. The apparatus of claim 8, wherein the common data analysis technique comprises one or more of an expression, a visualization, or an aggregation.

11. The apparatus of claim 10, wherein the common data analysis technique comprises one or more of a common user, a common data set, a common data type, a common visualization, or a common title.

12. The apparatus of claim 8, wherein the processor executable instructions that cause the apparatus to determine the common data analysis technique performed across the one or more data analysis sessions further cause the apparatus to determine a common feature associated with the one or more data analysis sessions, wherein the common feature comprises one or more of a common user, a common data set, a common data type, a common visualization, or a common title.

13. The apparatus of claim 8, wherein the further data analysis session comprises a visualization of the dataset based on the one or more further user selections, and wherein the processor executable instructions that cause the apparatus to apply the precedent to the further data analysis session further cause the apparatus to apply the precedent to the visualization of the dataset.

14. A non-transitory computer-readable storage medium comprising processor-executable instructions that, when executed by one or more processors of a computing device, cause the computing device to:
monitor one or more data analysis sessions associated with a dataset comprising a plurality of data records, wherein the one or more data analysis sessions comprise one or more user selections of one or more graphical objects of a plurality of graphical objects via one or more user interfaces, and wherein the one or more user selections of the one or more graphical objects cause a selection of one or more data records of the plurality of data records;
determine, based on the monitored one or more data analysis sessions, a common data analysis technique performed across the one or more data analysis sessions, wherein the common data analysis technique comprises a result of an evaluation of the one or more data records that are selected based on the one or more user selections of the one or more graphical objects via the one or more user interfaces;

identify the common data analysis technique as a precedent;

determining one or more dimensions associated with the one or more data records;

provide the precedent to a precedent engine, wherein the precedent comprises one or more parameters based on the one or more dimensions;

monitor a further data analysis session comprising one or more further user selections of the plurality of graphical objects via the one or more user interfaces, wherein the one or more further user selections cause a selection of a portion of the plurality of data records associated with the one or more dimensions and indicative of the one or more parameters;

provide, based on the one or more further user selections, at least one further graphical object, via the one or more user interfaces, during the further data analysis session, wherein the at least one further graphical object comprises an indication that the precedent is available to be applied to the further data analysis session, receive, via the one or more user interfaces during the further data analysis session, a selection of the at least one further graphical object; and apply, by the precedent engine, based on the selection of the at least one further graphical object, the precedent to the further data analysis session, wherein applying the precedent comprises performing the common data analysis technique based on the portion of the plurality of data records.

15. The non-transitory computer-readable storage medium of claim 14, wherein the one or more dimensions comprise one or more classification variables within the plurality of data records.

16. The non-transitory computer-readable storage medium of claim 14, wherein the common data analysis technique comprises one or more of an expression, a visualization, or an aggregation.

17. The non-transitory computer-readable storage medium of claim 16, wherein the common data analysis technique comprises one or more of a common user, a common data set, a common data type, a common visualization, or a common title.

18. The non-transitory computer-readable storage medium of claim 14, wherein the processor-executable instructions that cause the computing device to determine the common data analysis technique performed across the one or more data analysis sessions further cause the computing device to determine a common feature associated with the one or more data analysis sessions, wherein the common feature comprises one or more of a common user, a common data set, a common data type, a common visualization, or a common title.

19. The non-transitory computer-readable storage medium of claim 14, wherein the further data analysis session comprises a visualization of the dataset based on the one or more further user selections, and wherein the processor-executable instructions that cause the computing device to apply the precedent to the further data analysis session further cause the computing device to apply the precedent to the visualization of the dataset.

* * * * *